(12) United States Patent
Misawa

(10) Patent No.: US 8,159,718 B2
(45) Date of Patent: Apr. 17, 2012

(54) IMAGE PROCESSING TO DETERMINE IF PIXEL IN COMPRESSED DATA IS CHROMATIC OR ACHROMTIC BASED ON SELECTION THRESHOLD

(75) Inventor: Reiji Misawa, Tokyo (JP)

(73) Assignee: Canon Kabushiki Kaisha (JP)

( * ) Notice: Subject to any disclaimer, the term of this patent is extended or adjusted under 35 U.S.C. 154(b) by 722 days.

(21) Appl. No.: 12/329,032

(22) Filed: Dec. 5, 2008

(65) Prior Publication Data
US 2009/0147287 A1 Jun. 11, 2009

(30) Foreign Application Priority Data
Dec. 7, 2007 (JP) .................. 2007-317590

(51) Int. Cl.
*H04N 1/64* (2006.01)
*H04N 1/56* (2006.01)
(52) U.S. Cl. ....... 358/2.1; 358/3.24; 358/3.26; 358/539; 382/166; 382/235

(58) Field of Classification Search ............... 358/1.9, 358/2.1, 3.24, 3.26, 1.13, 515, 530, 539; 382/162, 164, 166, 232, 235
See application file for complete search history.

(56) References Cited

U.S. PATENT DOCUMENTS
5,604,598 A * 2/1997 Shigemura .............. 358/296
2009/0214108 A1* 8/2009 Yen et al. ................ 382/163

FOREIGN PATENT DOCUMENTS
JP 2935505 B2 6/1999
JP 2002-44464 A 2/2002
* cited by examiner

*Primary Examiner* — Scott A Rogers
(74) *Attorney, Agent, or Firm* — Rossi, Kimms & McDowell LLP

(57) ABSTRACT

An image processing apparatus includes a decision unit which decides a color selection threshold based on received compressed data from external apparatus, and a determination unit which determines according to the color selection threshold if a pixel included in the compressed data is a chromatic color pixel or an achromatic color pixel.

14 Claims, 22 Drawing Sheets

F I G. 5
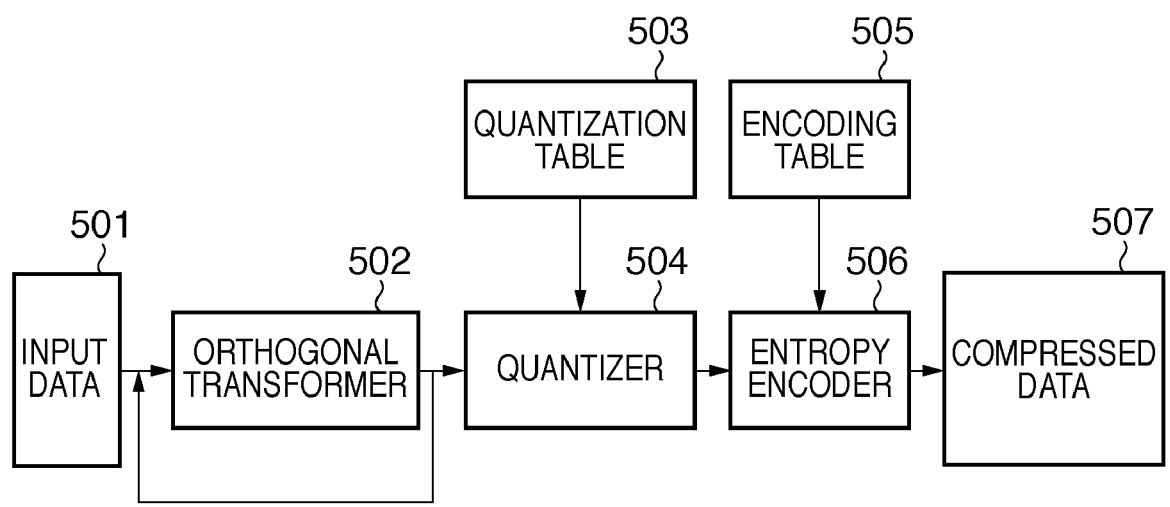

FIG. 6A

LOW-COMPRESSION QUANTIZATION TABLE

LUMINANCE QUANTIZATION TABLE
31, 21, 19, 31, 46, 77, 98, 117,
23, 23, 27, 36, 50, 111, 115, 106,
27, 25, 31, 46, 77, 109, 132, 108,
27, 33, 42, 56, 98, 167, 154, 119,
35, 42, 71, 108, 131, 209, 198, 148,
46, 67, 106, 123, 156, 200, 217, 177,
94, 123, 150, 167, 198, 232, 230, 194,
138, 177, 182, 188, 215, 192, 198, 190

COLOR DIFFERENCE QUANTIZATION TABLE
33, 35, 46, 90, 190, 190, 190, 190,
35, 40, 50, 127, 190, 190, 190, 190,
46, 50, 108, 190, 190, 190, 190, 190,
90, 127, 190, 190, 190, 190, 190, 190,
190, 190, 190, 190, 190, 190, 190, 190,
190, 190, 190, 190, 190, 190, 190, 190,
190, 190, 190, 190, 190, 190, 190, 190,
190, 190, 190, 190, 190, 190, 190, 190

FIG. 6B

HIGH-COMPRESSION QUANTIZATION TABLE

LUMINANCE QUANTIZATION TABLE
50, 34, 31, 50, 75, 125, 159, 190,
37, 37, 44, 59, 81, 181, 187, 172,
44, 41, 50, 75, 125, 178, 215, 175,
44, 53, 69, 90, 159, 255, 250, 193,
56, 69, 115, 175, 212, 255, 255, 240,
75, 109, 172, 200, 253, 255, 255, 255,
153, 200, 243, 255, 255, 255, 255, 255,
225, 255, 255, 255, 255, 255, 255, 255

COLOR DIFFERENCE QUANTIZATION TABLE
53, 56, 75, 147, 255, 255, 255, 255,
56, 66, 81, 206, 255, 255, 255, 255
75, 81, 175, 255, 255, 255, 255, 255,
147, 206, 255, 255, 255, 255, 255, 255,
255, 255, 255, 255, 255, 255, 255, 255,
255, 255, 255, 255, 255, 255, 255, 255,
255, 255, 255, 255, 255, 255, 255, 255,
255, 255, 255, 255, 255, 255, 255, 255

F I G. 15A
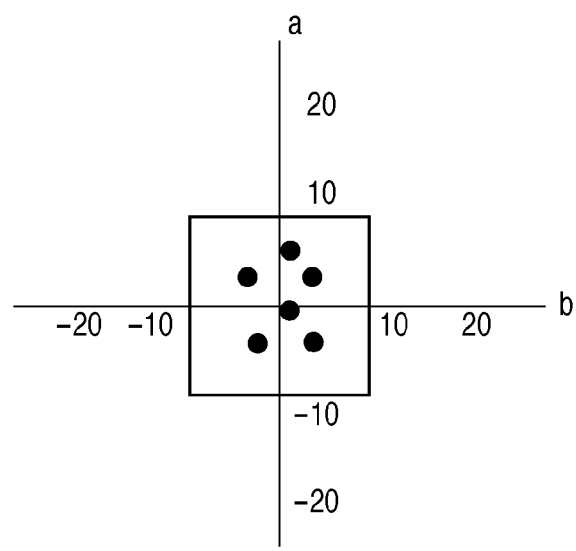
F I G. 15B
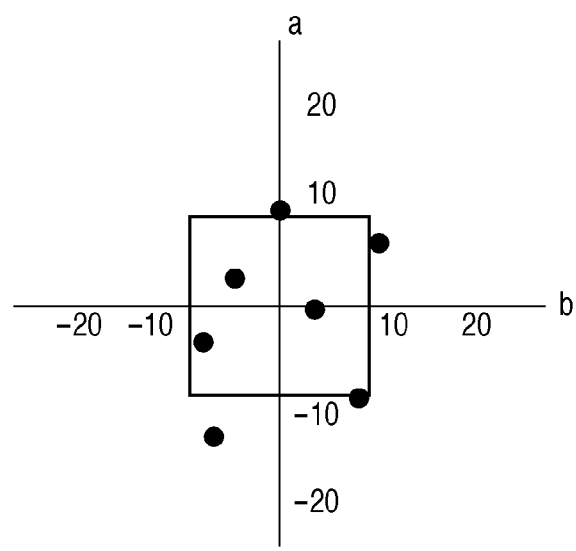
F I G. 15C
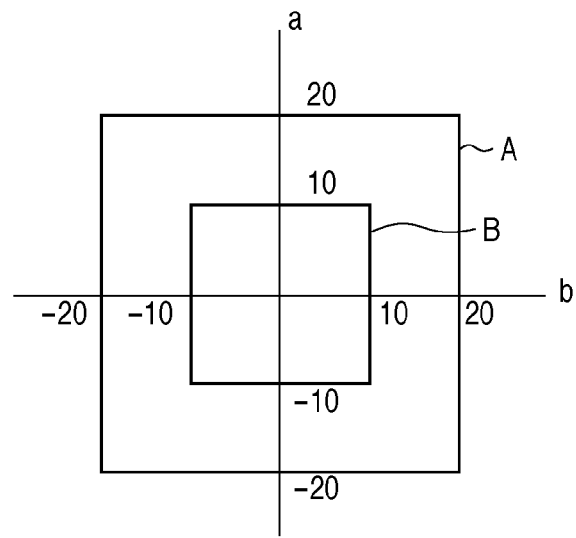

FIG. 17A

LOW-COMPRESSION QUANTIZATION TABLE

LUMINANCE QUANTIZATION TABLE
31, 21, 19, 31, 46, 77, 98, 117,
23, 23, 27, 36, 50, 111, 115, 106,
27, 25, 31, 46, 77, 109, 132, 108,
27, 33, 42, 56, 98, 167, 154, 119,
35, 42, 71, 108, 131, 209, 198, 148,
46, 67, 106, 123, 156, 200, 217, 177,
94, 123, 150, 167, 198, 232, 230, 194,
138, 177, 182, 188, 215, 192, 198, 190

COLOR DIFFERENCE QUANTIZATION TABLE
33, 35, 46, 90, 190, 190, 190, 190,
35, 40, 50, 127, 190, 190, 190, 190,
46, 50, 108, 190, 190, 190, 190, 190,
90, 127, 190, 190, 190, 190, 190, 190,
190, 190, 190, 190, 190, 190, 190, 190,
190, 190, 190, 190, 190, 190, 190, 190,
190, 190, 190, 190, 190, 190, 190, 190,
190, 190, 190, 190, 190, 190, 190, 190

FIG. 17B

HIGH-COMPRESSION QUANTIZATION TABLE

LUMINANCE QUANTIZATION TABLE
50, 34, 31, 50, 75, 125, 159, 190,
37, 37, 44, 59, 81, 181, 187, 172,
44, 41, 50, 75, 125, 178, 215, 175,
44, 53, 69, 90, 159, 255, 250, 193,
56, 69, 115, 175, 212, 255, 255, 240,
75, 109, 172, 200, 253, 255, 255, 255,
153, 200, 243, 255, 255, 255, 255, 255,
225, 255, 255, 255, 255, 255, 255, 255

COLOR DIFFERENCE QUANTIZATION TABLE
53, 56, 75, 147, 255, 255, 255, 255,
56, 66, 81, 206, 255, 255, 255, 255
75, 81, 175, 255, 255, 255, 255, 255,
147, 206, 255, 255, 255, 255, 255, 255,
255, 255, 255, 255, 255, 255, 255, 255,
255, 255, 255, 255, 255, 255, 255, 255,
255, 255, 255, 255, 255, 255, 255, 255,
255, 255, 255, 255, 255, 255, 255, 255

F I G. 20B
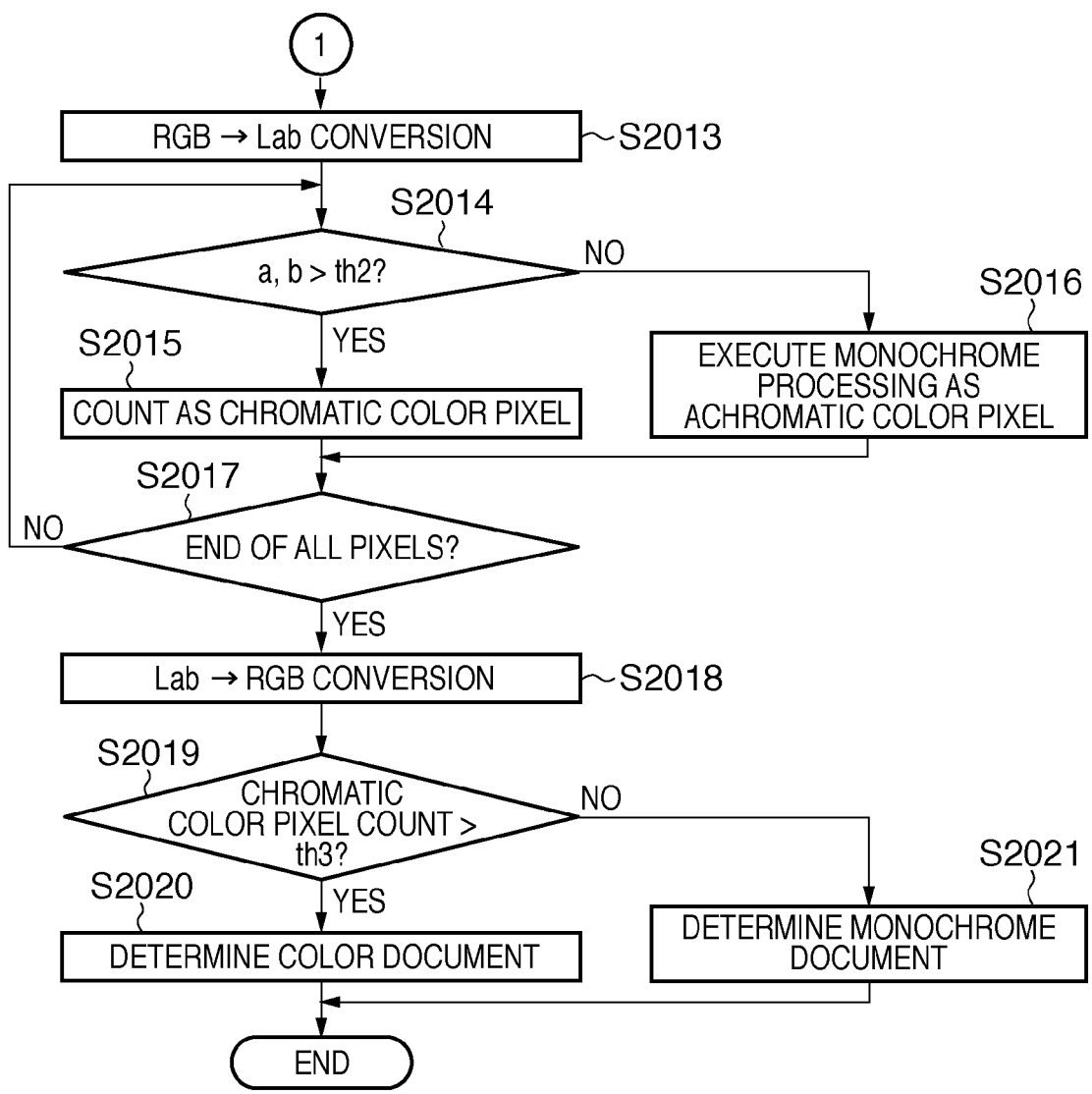

IMAGE PROCESSING TO DETERMINE IF PIXEL IN COMPRESSED DATA IS CHROMATIC OR ACHROMTIC BASED ON SELECTION THRESHOLD

BACKGROUND OF THE INVENTION

1. Field of the Invention

The present invention relates to an image processing apparatus, which executes color selection processing.

2. Description of the Related Art

Conventionally, a remote-copy function which connects a scanner, printer, and MFP with each other via a network or the like, and outputs a document image input by the scanner or MFP using another printer or MFP via the network is prevalent. Note that the MFP (Multifunction Peripheral) generally indicates a composite peripheral equipment which has a plurality of functions. In the following description, assume that a scanner, MFP, or the like, which inputs a document image upon execution of remote-copy processing, will be referred to as a sender, and a printer, MFP, or the like, which outputs the document image, will be referred to as a receiver.

In general, upon remote-copying a color document image, the sender side compresses color data so as to reduce a network load. As a compression method of color data, JPEG and JPEG2000 as the international standards of still image encoding are generally known. As image data formats which support one or both of JPEG and JPEG2000, PDF of Adobe Systems, TIFF of Microsoft and Aldus, WMP of Microsoft, and the like are known. That is, the JPEG, PDF, TIFF, and WMP formats can be used as principal image data formats upon remote-copying a color document image. Data compressed by the sender side are decompressed and output on the receiver side. Furthermore, the user can arbitrarily set a compression ratio upon compressing data on the sender side. For example, when the user sets a high compression ratio, since the data size can be reduced, data transfer efficiency can be improved, and the memory use size on the receiver side can be reduced. However, the compression ratio arbitrary set on the sender side may deteriorate image quality.

Conventionally, in a color MFP, an ACS (Automatic Color Selection) function is prevalently used. With such ACS function, the number of color pixels in a document is calculated and is statistically processed to check if an input document image is a color or monochrome image. Based on this checking result, image formation using four colors, i.e., C (cyan), M (magenta), Y (yellow), and K (black), or black alone can be made. It is important for such color selection function to solve problems posed when a monochrome document image is undesirably formed using four colors, i.e., C, M, Y, and K colors (for example, wasting of toners, inks, or the like, a quality drop due to slight color misregistration, unwanted color charging for a monochrome document, and so forth).

Japanese Patent Laid-Open No. 2002-44464 discloses a method and apparatus, which can appropriately execute color selection processing of a document in accordance with a document type. According to this method and apparatus, this reference describes that a low-saturation image can be determined as a color image, a low-saturation color character can be recognized as a monochrome character with high visibility, and recognition errors due to color misregistration or the like can be reduced. Also, Japanese Patent No. 2935505 discloses an image processing apparatus and method, which can prevent determination errors of an achromatic color region of an input image. According to this method and apparatus, the reference describes that determination errors due to different reading conditions can be eliminated by changing a threshold used to determine a chromatic or achromatic color in accordance with the drive condition of a drive scan unit in a reading scan unit of a document reader.

However, these references do not particularly describe problems such as outputting of a monochrome document as a color image, and outputting of a monochrome printed part of a color document as a color part in the arrangement in which the remote-copy processing is executed from the sender to the receiver. In such arrangement, for example, when the sender does not have any ACS function, the problems such as printing of a monochrome document as a color image and so forth may occur. In general, a low-profile, low-end scanner such as a flatbed scanner or the like, which attaches an importance on usability does not normally have any ACS function. Therefore, in the remote-copy function, when a scan image is compressed when it is saved in a hard disk or it is sent, monochrome pixels may be changed to color pixels. For example, a monochrome pixel defined by equivalent values R (red)=G(green)=B (blue)=40 may be changed to R=40, G=45, and B=40, thus causing a color fluctuation. As a result, a monochrome document image is changed to a color image, or a monochrome printed part of a color document is changed to a color image.

On the other hand, even when the sender has the ACS function, a problem that a monochrome document is printed as a color image without reflecting an ACS result upon sending may be posed. In the ACS function, the number of color pixels in a document is counted and is statistically processed. Therefore, the processing result is ready in time for local-copy print processing as a normal copy function, but it may not be ready in time for remote-copy sending processing depending on the processing performance of the ACS function in the sender. In such case, the sender transfers data as a color image. As a result, the receiver outputs a color image.

As described above, the problems such as printing of a monochrome document as a color image and the like are often posed irrespective of the presence/absence of the ACS function on the sender side. The receiver may execute color selection processing of color and monochrome documents using the ACS function. However, since the color selection threshold of the ACS function is fixed, deterioration of image quality and color fluctuations caused by a compression ratio arbitrarily set by the user on the sender side cannot be coped with.

SUMMARY OF THE INVENTION

The present invention provides an image processing apparatus which can improve the color selection precision of color and monochrome documents.

The present invention in its first aspect provides an image processing apparatus which receives compressed data from external apparatus, and determines based on pixels included in the compressed data if the compressed data is a color document data or a monochrome document data, the apparatus comprising: a decision unit configured to decide a color selection threshold based on the received compressed data; and a determination unit configured to determine according to the color selection threshold decided by the decision unit if a pixel included in the compressed data is a chromatic color pixel or an achromatic color pixel.

The present invention in its second aspect provides an image processing method executed by an image processing apparatus which receives compressed data from external apparatus, and determines based on pixels included in the compressed data if the compressed data is a color document data or a monochrome document data, the method comprising: a decision step of deciding a color selection threshold based on the received compressed data; and a determination step of determining according to the color selection threshold decided in the decision step if a pixel included in the compressed data is a chromatic color pixel or an achromatic color pixel.

The present invention in its third aspect provides a computer-readable medium storing an image processing program, which receives compressed data from external apparatus, and determines based on pixels included in the compressed data if the compressed data is a color document data or a monochrome document data, the program causing a computer function to: decide a color selection threshold based on the received compressed data; and determine according to the decided color selection threshold if a pixel included in the compressed data is a chromatic color pixel or an achromatic color pixel.

According to the present invention, the color selection precision of color and monochrome documents can be improved.

Further features of the present invention will become apparent from the following description of exemplary embodiments with reference to the attached drawings.

BRIEF DESCRIPTION OF THE DRAWINGS

FIG. 5 is a block diagram showing a general arrangement of compression processing in JPEG encoding as the international standard method;

FIG. 6A is a view showing an example of a low-compression quantization table;

FIG. 6B is a view showing an example of a high-compression quantization table;

FIG. 15A is a view for explaining a color selection threshold set in step S1305 or S1306 shown in FIG. 13;

FIG. 15B is another view for explaining a color selection threshold set in step S1305 or S1306 shown in FIG. 13;

FIG. 15C is still another view for explaining a color selection threshold set in step S1305 or S1306 shown in FIG. 13;

FIG. 17A is a view for explaining an example of a calculation method described in FIG. 16;

FIG. 17B is another view for explaining an example of a calculation method described in FIG. 16;

FIGS. 20A and 20B are flowcharts showing details of color selection processing according to the fourth embodiment.

DESCRIPTION OF THE EMBODIMENTS

Figure 1:
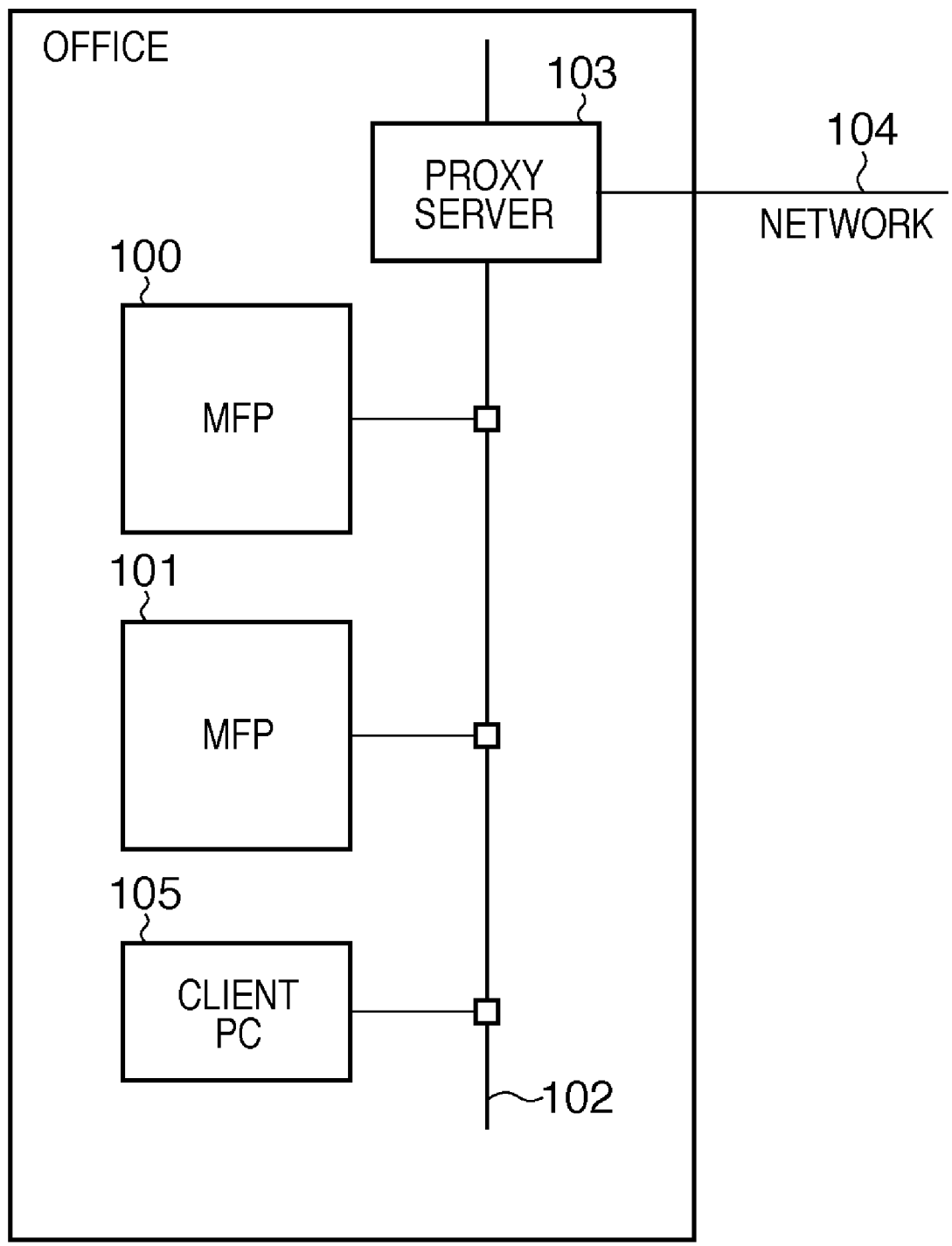
FIG. 1 is a block diagram showing the arrangement of an image processing system according to an embodiment of the present invention.

The best mode of carrying out the present invention will be described in detail hereinafter with reference to the accompanying drawings. Note that the same reference numerals denote the same components, and a repetitive description thereof will be avoided.

FIG. 1 is a block diagram showing the arrangement of an image processing system according to an embodiment of the present invention. As shown in FIG. 1, MFPs 100 and 101, each of which is a multifunction peripheral that implements a plurality of types of functions, a client PC 105, and a proxy server 103 are connected to a LAN 102 laid in, e.g., an office. The plurality of types of functions of the MFPs 100 and 101 include, for example, a copy function, print function, and send function. The LAN 102 is connected to a network 104 via the proxy server 103.

The MFPs 100 and 101 have a remote-copy function, and for example, a document image input using the MFP 100 can be output using the MFP 101. Conversely, a document image input using the MFP 101 can also be output using the MFP 100. Note that in the description of the remote-copy function of this embodiment, the MFP 100 will also be referred to as a sender, and the MFP 101 will also be referred to as a receiver. In this embodiment, a sender may be a scanner that can be connected to the network, and a receiver may be a printer that can be connected to the network.

The client PC 105 sends, e.g., print data to the MFP 100, which can print printed materials based on that print data.

Each of the client PC 105 and proxy server 103 has standard components included in a general-purpose computer such as a CPU, RAM, ROM, hard disk, external storage device, network interface, display, keyboard, mouse, and the like.

In this embodiment, a plurality of offices having similar components may be connected to the network 104.

As the network 104, for example, the Internet, LAN, WAN, telephone line, dedicated digital line, ATM, frame relay line, communication satellite line, cable television line, and data broadcasting wireless line may be used. Also, these networks may be combined to configure a communication network that allows data exchange.

Figure 2:
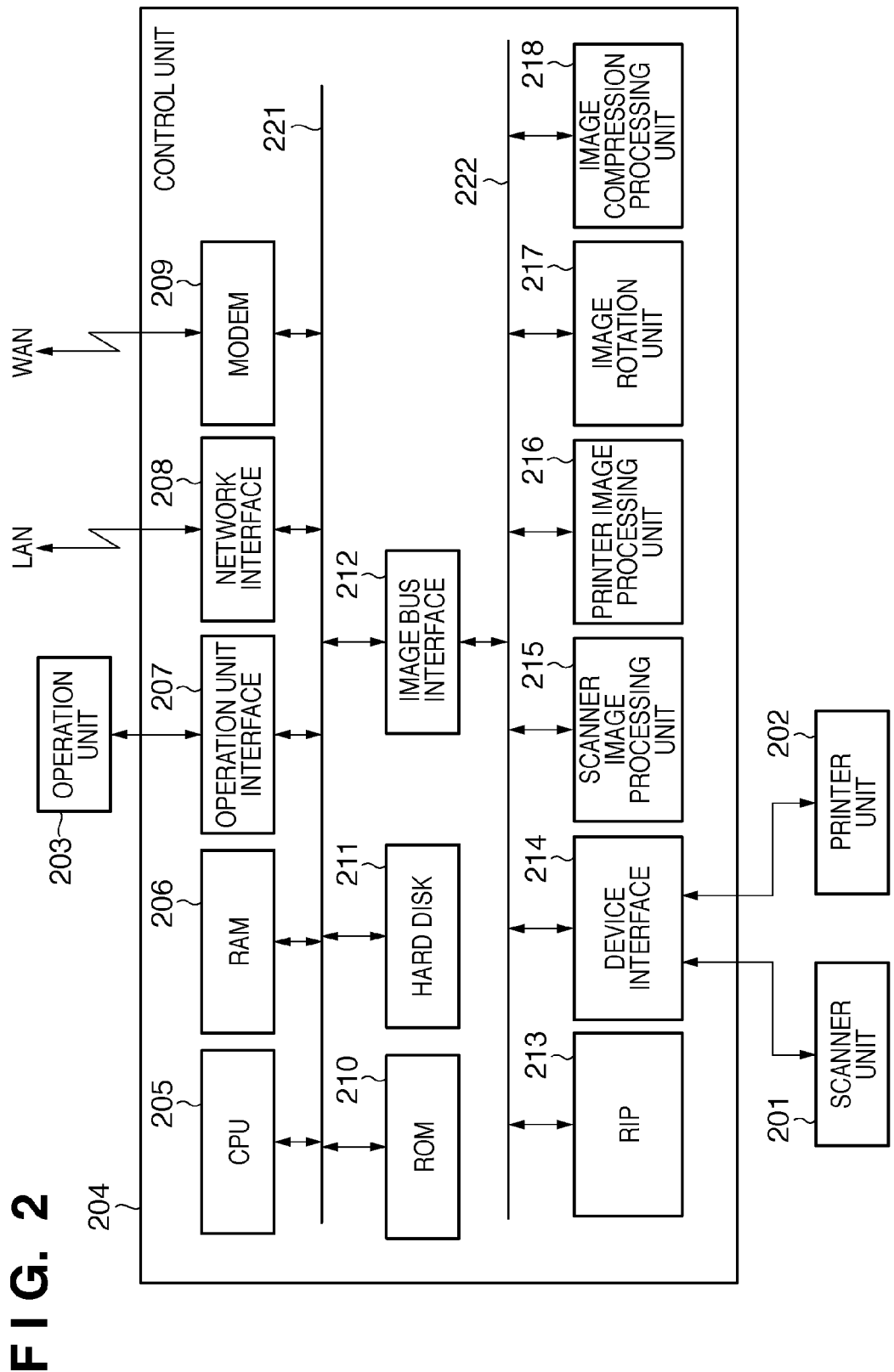
FIG. 2 is a block diagram showing the arrangement of an MFP shown in FIG. 1.

FIG. 2 is a block diagram showing the arrangement of the MFP 100 shown in FIG. 1. As shown in FIG. 2, the MFP 100 includes a scanner unit 201 as an image input device, a printer unit 202 as an image output device, a control unit 204 which includes a CPU, memory, and the like, and an operation unit 203 serving as a user interface. The scanner unit 201 has an ADF (Auto Document Feeder).

The control unit 204 connects the scanner unit 201, printer unit 202, and operation unit 203, and is connected to a LAN or WAN to allow to exchange image information and device information. As the WAN, for example, a public line as a general telephone line network is used. A CPU 205 is a controller which controls the overall system. A RAM 206 is a system work memory required for the operation of the CPU 205, and is also an image memory used to temporarily store image data. A ROM 210 is a boot ROM, and stores, for example, programs such as a boot program of a system and the like. A hard disk 211 is a hard disk drive, and stores, for example, system control software and image data. An operation unit interface 207 is an interface unit with the operation unit 203, and outputs image data to be displayed on the operation unit 203 to the operation unit 203. The operation unit interface 207 transfers information input by the user of this image processing apparatus via the operation unit 203 to the CPU 205. A network interface 208 connects this image processing apparatus to a LAN and exchanges information in a packet format. A modem 209 connects this image processing apparatus to a public line, and demodulates, modulates, and exchanges information. The aforementioned devices are connected to a system bus 221.

An image bus interface 212 is a bus bridge, which connects the system bus 221 and an image bus 222, converts data structures, and transfers image data at high speed. As the image bus 222, for example, a PCI bus or IEEE1394 is used. In this embodiment, the following devices are connected to the image bus 222.

An RIP 213 as a raster image processor interprets PDL codes to rasterize them to a bitmap image of a designated resolution. Upon rasterizing, the RIP 213 executes region selection processing for appending attribute information to each pixel or region is executed. As a result of the region selection processing, attribute information indicating a type of object such as "text", "line", "graphics", "image", and the like is appended to each pixel or region. For example, the RIP 213 outputs a region signal according to the type of object described using a PDL, and attribute information according to an attribute indicated by that signal value is saved in association with a pixel or region corresponding to the object. In this embodiment, the attribute information associated in this way is appended to image data. A device interface 214 connects the scanner unit 201 as an image input device to the control unit 204 via a signal line. Also, the device interface 214 connects the printer unit 202 to the control unit 204 via a signal line. In this arrangement, conversion between image data of a synchronous system and that of an asynchronous system is executed.

A scanner image processing unit 215 executes correction, modification, and editing of input image data. A printer image processing unit 216 applies correction, resolution conversion, and the like according to the printer unit 202 to print output image data to be output to the printer unit 202. An image rotation unit 217 rotates input image data, and outputs the rotated image data. An image compression processing unit 218 applies JPEG compression/decompression processing or compression/decompression processing unique to a device to multi-valued image data, or applies compression/decompression processing such as JBIG, MMR, MH, or the like to binary image data. The arrangement of the MFP 101 is the same as that of the MFP 100.

Figure 3:
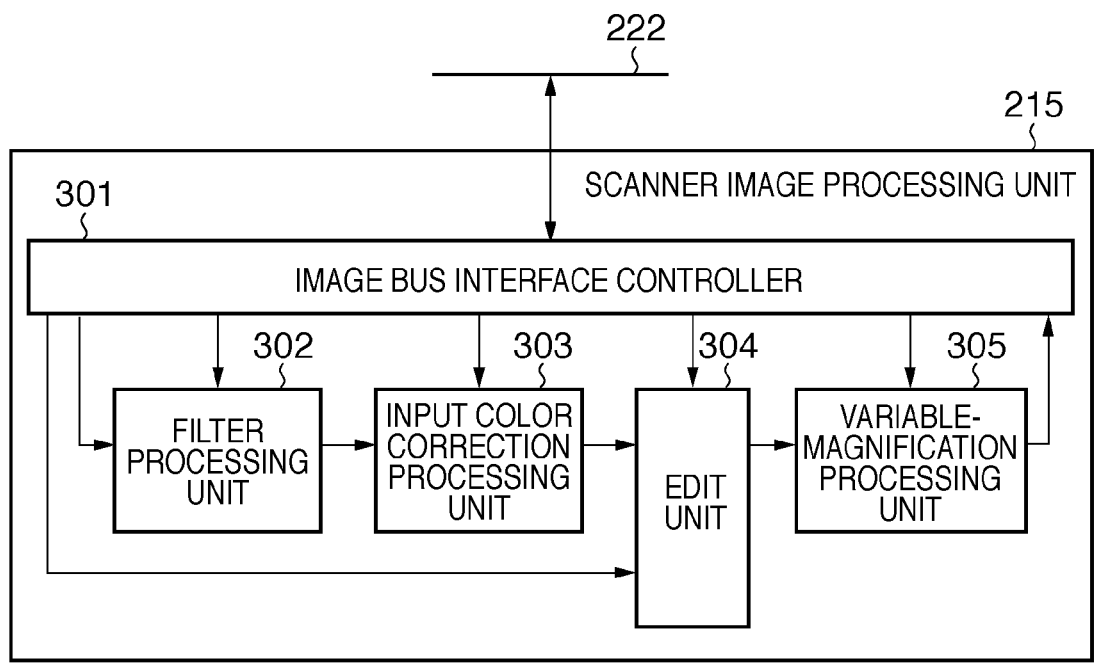
FIG. 3 is a block diagram showing the arrangement of a scanner image processing unit shown in FIG. 2.

FIG. 3 is a block diagram showing the arrangement of the scanner image processing unit 215 shown in FIG. 2. As shown in FIG. 3, an image bus interface controller 301 is connected to the image bus 222. The image bus interface controller 301 controls a bus access sequence to execute timing control of respective devices in the scanner image processing unit 215. A filter processing unit 302 is a spatial filter, which makes convolution calculations. An input color correction processing unit 303 executes processing for converting read image data onto an appropriate color space using a three-dimensional LUT (Look Up Table). An edit unit 304 recognizes, for example, a closed region bounded using a marker pen, and applies image modification processing such as shading, hatching, negative-positive reversal, and the like to image data within the closed region. A variable-magnification processing unit 305 executes enlargement/reduction processing by making interpolation calculations in the main scan direction of a raster image upon changing the resolution of the read image. In the sub-scan direction, the enlargement/reduction processing is implemented by changing the scan speed of an image reading line sensor (not shown). When a document includes text and photo regions, these text and photo regions in an image are separated, and text/photo selection signals indicating respective regions are output.

Figure 4:
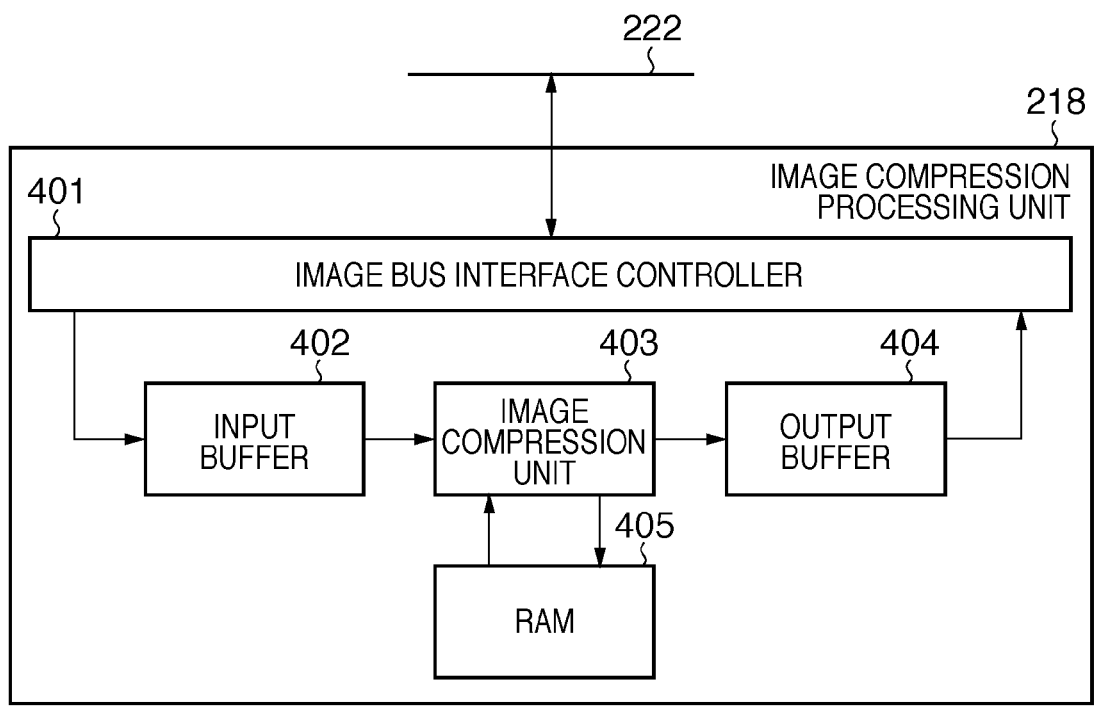
FIG. 4 is a block diagram showing an example of the detailed arrangement of an image compression processing unit shown in FIG. 2.

FIG. 4 is a block diagram showing an example of the detailed arrangement of the image compression processing unit 218 shown in FIG. 2. The operation of the image compression processing unit 218 will be described below with reference to FIG. 4. As shown in FIG. 4, an image bus interface controller 401 is connected to the image bus 222. The image bus interface controller 401 controls a bus access sequence to attain timing control, so as to exchange data with an input buffer 402 and output buffer 404, and to make mode settings and the like in an image compression unit 403. The image compression unit 403 writes compressed data in a RAM 405 according to compression/decompression settings such as JPEG, JBIG, MMR, MH, and the like set by the image bus interface controller 401.

A JPEG compression method as an example of the compression method in the image compression unit shown in FIG. 4 will be described below. FIG. 5 is a block diagram showing a general arrangement of compression processing in JPEG encoding as the international standard method. Since details are described in JPEG (ITU-T T.81|ISO/IEC10918-1) recommended by ISO and ITU-T as the international standard still image encoding method, a description thereof will not be given.

Input data 501 as image data is divided into blocks each including 8×8 pixels, which are input to a subsequent orthogonal transformer 502. The orthogonal transformer 502 transforms spatial data into frequency data by two-dimensional DCT (Discrete Cosine Transform) processing, and outputs 64 DCT coefficients. Note that the input data 501 is divided into spatial data in each of which pixels are two-dimensionally distributed in an 8×8 block. The orthogonal transformer 502 applies one-dimensional DCT processing to respective rows of each block to consequently obtain frequency transform results in the horizontal direction. Then, the orthogonal transformer 502 applies one-dimensional DCT processing to respective columns of that block using the above results to perform frequency conversion, thereby obtaining two-dimensional DCT coefficients. Upon repeating the one-dimensional DCT processing, if the order of rows and columns is reversed, the same results are obtained. Of the DCT coefficients obtained in this way, an upper left coefficient is called a DC component, and the remaining 63 coefficients are called AC components. The DCT coefficients output from the orthogonal transformer 502 are linearly quantized by a quantizer 504 using a quantization table 503 set with quantization steps. Furthermore, the quantized coefficients further undergo compression processing by an encoding table 505 and entropy encoder 506, thus generating compressed data 507.

FIGS. 6A and 6B are views showing examples of quantization tables. FIG. 6A shows an example of a low-compression quantization table, and FIG. 6B shows an example of a high-compression quantization table. The user can set a compression ratio upon execution of the remote-copy processing. If the user selects "low compression" in a compression ratio setting, quantization is executed using the quantization table shown in FIG. 6A. If the user selects "high compression", quantization is executed using the quantization table shown in FIG. 6B. The compressed data 507 holds the quantization table 503, encoding table 505, and sub-sampling compression coefficients (not shown) applied at the time of compression.

Figure 7:
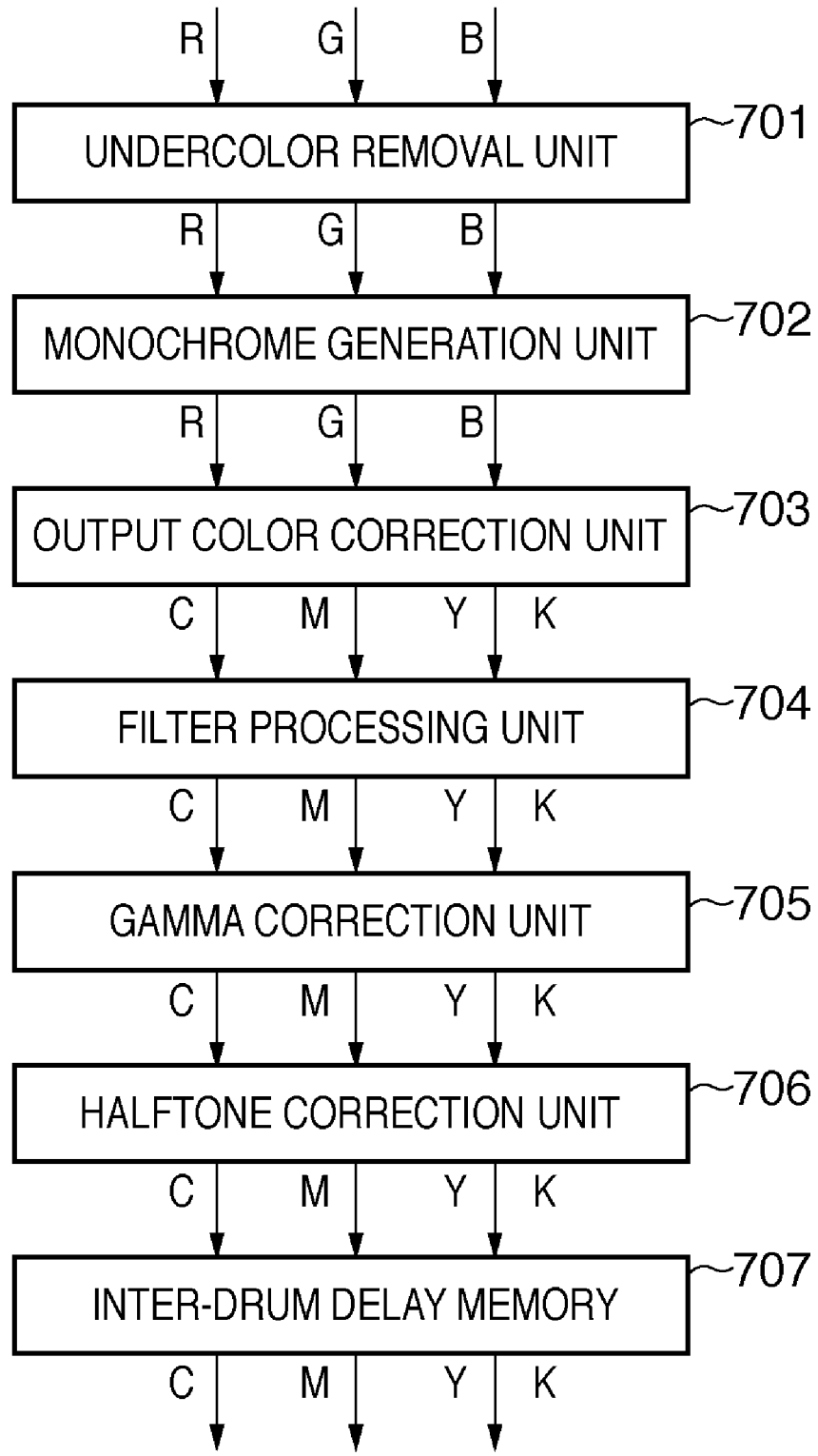
FIG. 7 is a block diagram showing the arrangement of a printer image processing unit.

FIG. 7 is a block diagram showing the arrangement of the printer image processing unit 216. An undercolor removal unit 701 removes an undercolor of image data to remove unwanted background fogging. For example, the undercolor removal unit 701 executes undercolor removal using 3×8 matrix calculations or a one-dimensional LUT. A monochrome generation unit 702 converts color image data such as RGB data or the like into data of a gray single color when color image data is converted into monochrome image data and the converted image data is printed using a single color. For example, the monochrome generation unit 702 makes 1×3 matrix calculations for multiplying R, G, and B data by arbitrary constants to generate a gray signal. An output color correction unit 703 executes color correction in correspondence with the characteristics of the printer which outputs image data. For example, the output color correction unit 703 executes processing by 4×8 matrix calculations or direct mapping. For an input pixel defined by equivalent values R=G=B, the output color correction unit 703 generates a black single color in place of four colors, i.e., C, M, Y, and K colors. A filter processing unit 704 arbitrarily corrects the spatial frequencies of image data. For example, the filter processing unit 704 corrects the spatial frequencies by making 9×9 matrix calculations. A gamma correction unit 705 executes gamma correction in correspondence with the characteristics of the output printer. Normally, the gamma correction unit 705 has a one-dimensional LUT. A halftone correction unit 706 executes arbitrary halftoning in correspondence with the number of tones of the output printer, and can implement arbitrary screen processing and error diffusion such as binarization, 32-ary conversion, and the like. These processes can be switched based on text/photo selection signals (not shown). An inter-drum delay memory 707 is used to superimpose C, M, Y, and K images by shifting the print timings of C, M, Y, and K colors in correspondence with a spacing between neighboring drums in a color printer having drums for C, M, Y, and K colors. The inter-drum delay memory 707 can delay the print timings to adjust image positions in the color printer having the drums for C, M, Y, and K colors.

Figure 8:
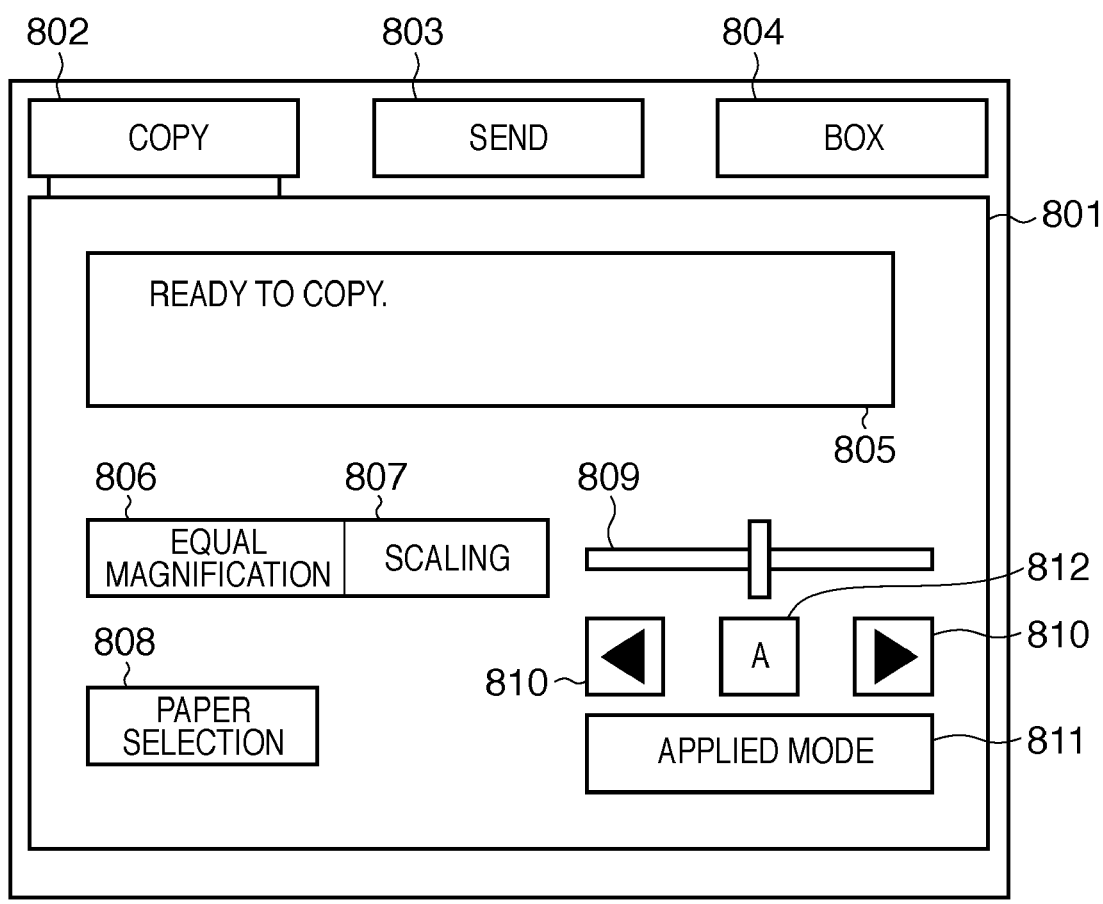
FIG. 8 is a view showing an example of a basic screen of a liquid crystal display on an operation unit shown in FIG. 2.

FIG. 8 is a view showing an example of a basic screen of a liquid crystal display on the operation unit shown in FIG. 2. The screen shown in FIG. 8 is made by a touch panel, and the user can execute a given displayed function by touching inside a frame of that function. When the user presses a key 802 upon making a copy operation, a basic screen 801 is displayed. A key 803 is pressed when the user wants to make a send operation, and is mainly used upon execution of a SEND function, FAX function, remote-copy function, and the like. The SEND function is a function of sending image data which is generated by the MFP 100 or 101 and is compressed by JPEG, MMR, or the like to another external apparatus via the network. Upon pressing a key 804, data saved in the hard disk 211 shown in FIG. 2 are displayed or output.

A window 805 displays a message or user setting items such as a magnification, paper size, copy count, and the like. A key 806 is pressed when the user wants to set 100% as a copy magnification. Using a reduction key or enlargement key (not shown), reduction or enlargement processing can be executed using fixed rate scaling. A key 807 is pressed when the user wants to set a magnification within, e.g., a range between 25% to 800%. A key 808 is pressed when the user wants to select a copy paper sheet. Keys 810 are pressed to perform density adjustment. When the user presses one of the keys 810, an indication on a density indicator 809 moves to the right or left. A key 812 is pressed when the user wants to copy a document with a dark background such as a newspaper after automatic density adjustment. By pressing a key 811, a setting mode for applying hatching, shading, trimming, masking, and the like to a copy image can be set. In this embodiment, the screen 801 may include a user mode key used to set a user environment, and expansion function keys to set a continuous page shot mode, a double-sided copy mode, a binding margin, and the like, although not shown.

Figure 9:
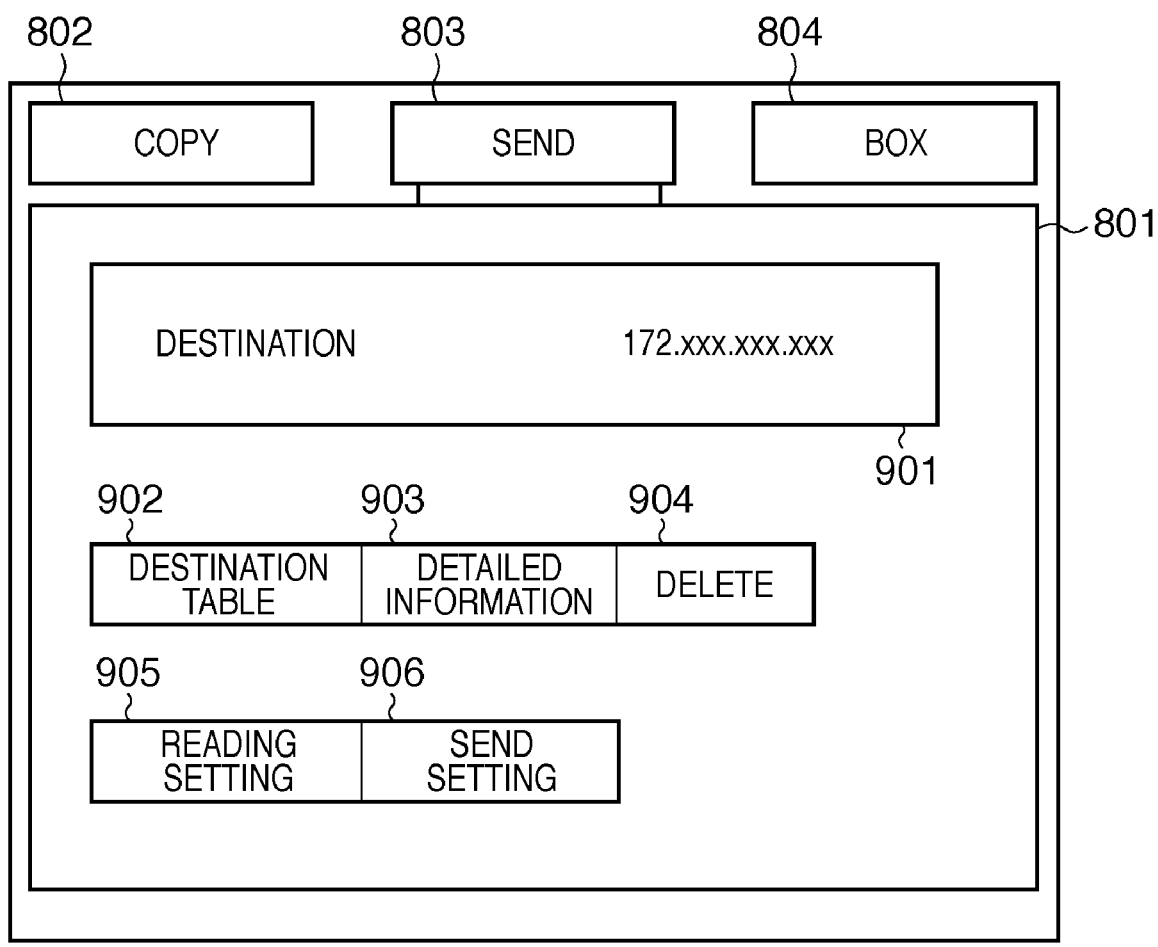
FIG. 9 is a view showing an example of a basic screen displayed when a send key shown in FIG. 8 is pressed.

FIG. 9 is a view showing an example of a basic screen displayed upon pressing the key 803 shown in FIG. 8. A key 905 is used to set the resolution, density, and the like upon reading an image. A key 906 is used to set a compression ratio and the like upon sending.

Figure 10:
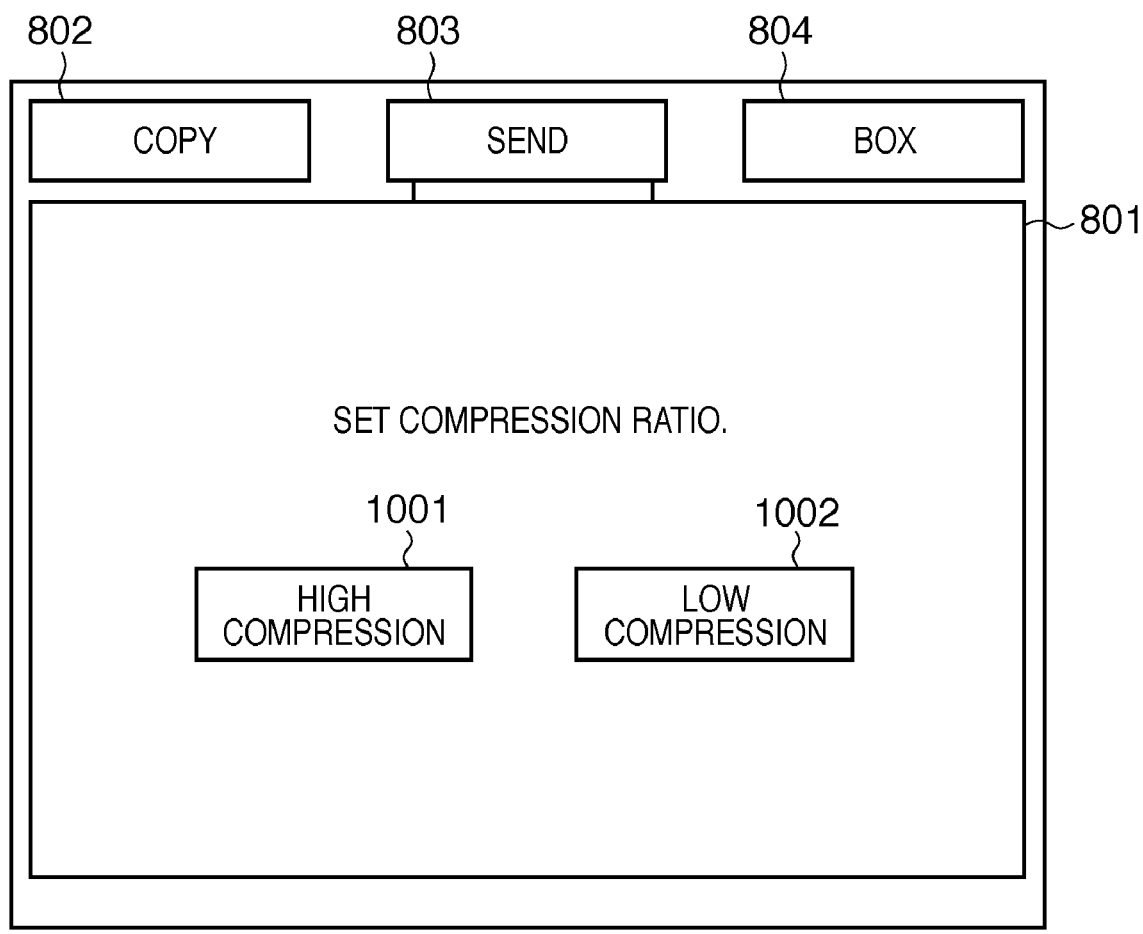
FIG. 10 is a view showing an example of a compression ratio setting screen upon sending.

FIG. 10 is a view showing an example of a compression ratio setting screen upon sending. On the screen shown in FIG. 10, the user can set a compression ratio by selecting "low compression" or "high compression". Upon selection of "high compression" using a key 1001, the data size can be reduced and the data transfer efficiency or the like can be improved, but image quality deteriorates. Upon selection of "low compression" using a key 1002, the data size is increased and image quality can be improved, but the data transfer efficiency drops.

Referring back to FIG. 9, a window 901 shown in FIG. 9 displays a send destination designated using a key 902. In this embodiment, assume that when the user designates a PC using the key 902, the SEND function is executed; when he or she designates an MFP, the remote-copy function is executed. A key 903 is pressed when the user wants to display detailed information of one destination displayed on the window 901. A key 904 is pressed when the user wants to delete one destination displayed on the window 901.

Figure 12:
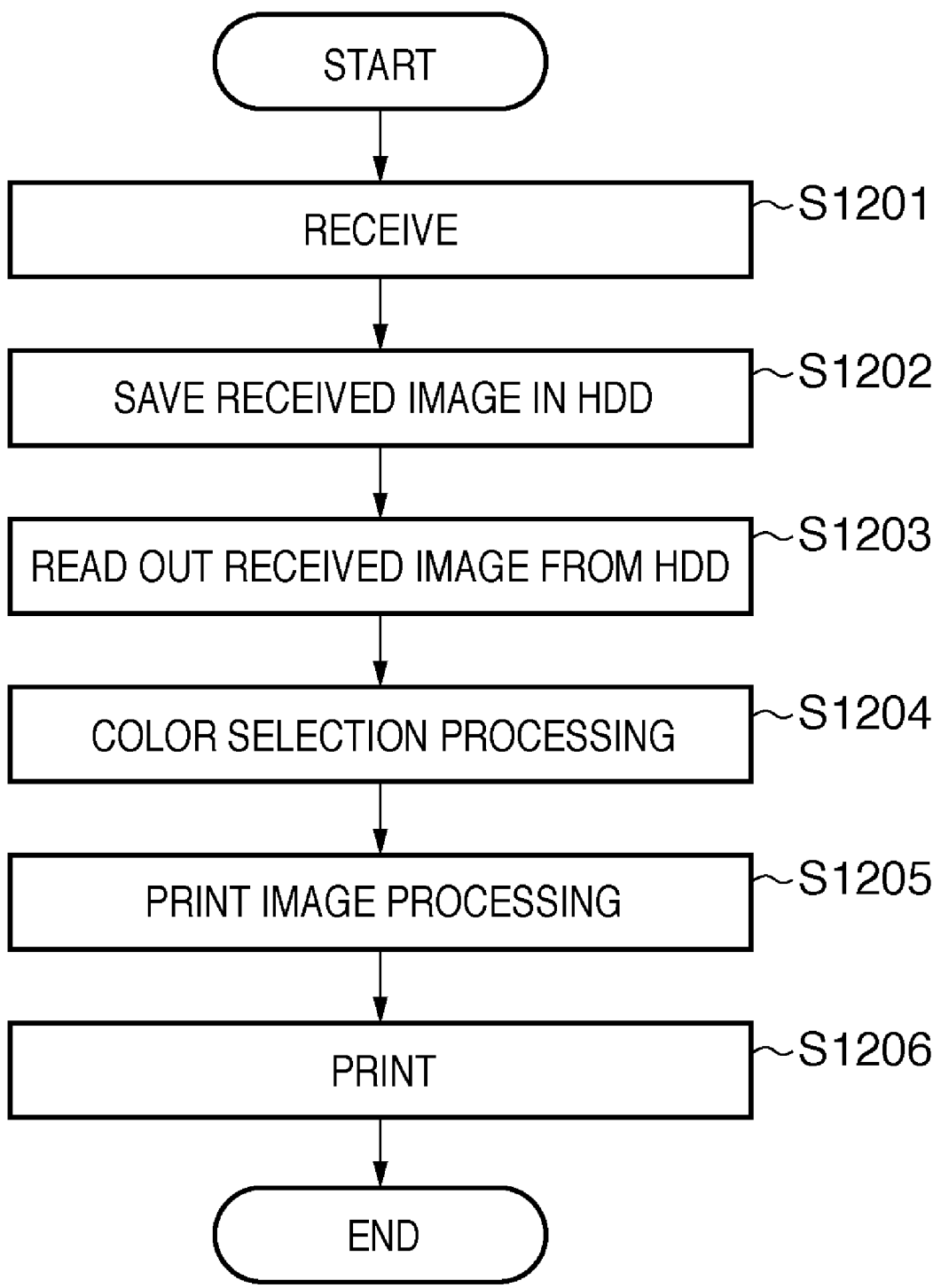
FIG. 12 is a flowchart for explaining the sequence of processing of an MFP serving as a receiver.
Figure 13:
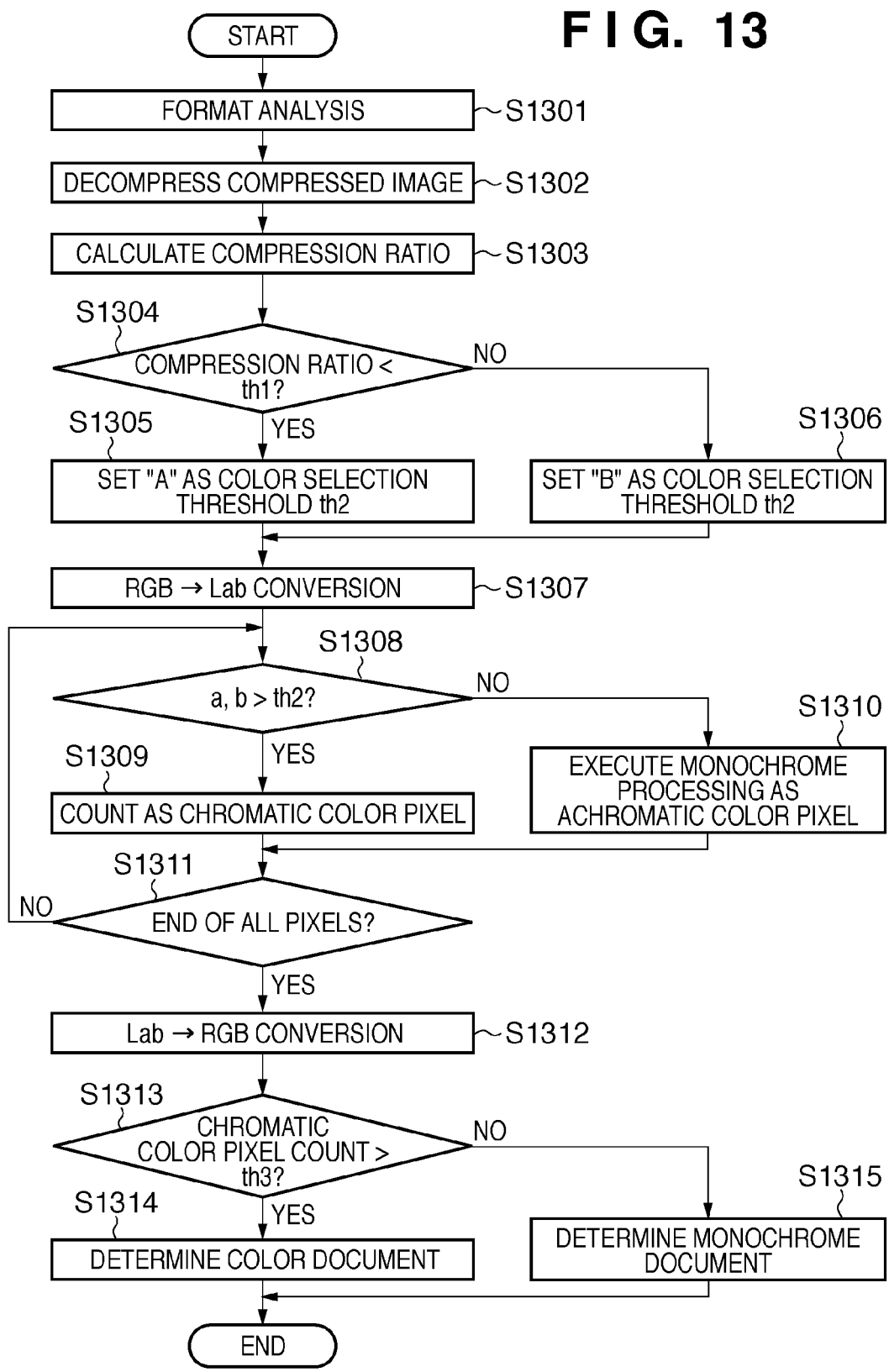
FIG. 13 is a flowchart showing the sequence of color selection processing according to the first embodiment.

The sequence of processing for executing the remote-copy function using the MFPs in this embodiment will be described below with reference to FIGS. 11, 12, and 13. Programs required to implement the flowcharts shown in FIGS. 11 to 13 are stored in the ROM 210 or hard disk 211 shown in FIG. 2, and are executed by the CPU 205.

Figure 11:
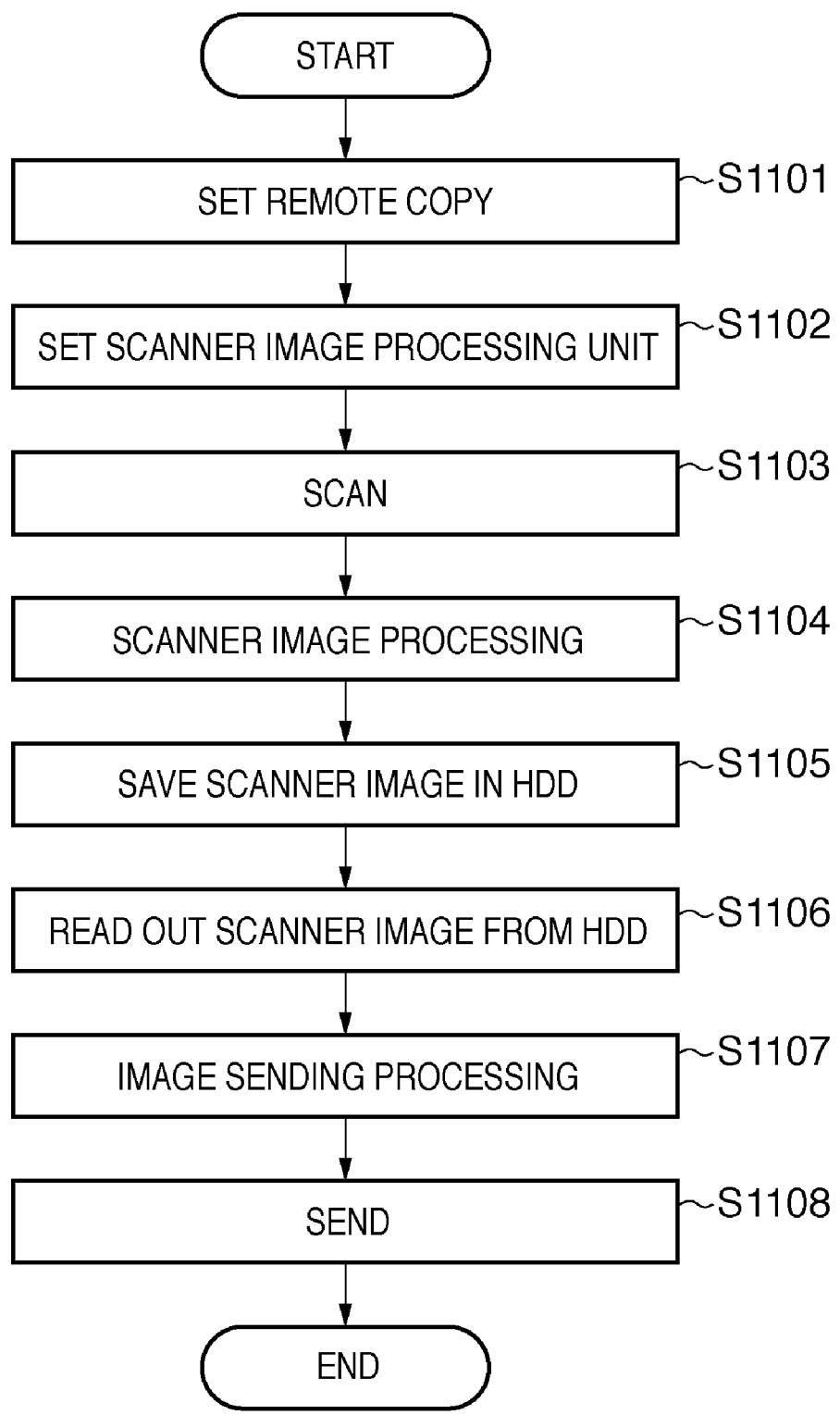
FIG. 11 is a flowchart for explaining the sequence of processing of an MFP serving as a sender.

FIG. 11 is a flowchart for explaining the sequence of processing of the MFP 100 as a sender. In step S1101, the user sets the MFP 101 as an output destination in the remote-copy function using the operation unit 203 of the MFP 100 as the sender. In this case, when the user designates the MFP 101 using the key 902 shown in FIG. 9, the window 901 may display the IP address and the like of the MFP 101. Furthermore, the user can set a compression ratio using the key 906.

In step S1102, the user sets the scanner image processing unit. For example, the user sets the resolution, density, and the like upon reading of an image using the key 905 of the operation unit shown in FIG. 9.

After a scan operation is made in step S1103, the scanner image processing unit 215 executes the scanner image processing described using FIG. 3 in step S1104. Also, in step S1104 the scanner image processing unit 215 executes processing according to the reading settings set in step S1102.

In step S1105, a scanner image is temporarily saved in the hard disk 211. In general, the image is compressed in this case.

In step S1106, the image saved in step S1105 is read out. If the image is compressed in step S1105, it is decompressed as needed. The compressed image saved in the hard disk 211 may be saved for re-use later or may be deleted.

Next, in step S1107 the scanner image read out in step S1106 undergoes image sending processing. This image sending processing will be described later.

In step S1108, the image is sent to the MFP 101 designated as the output destination in step S1101, thus ending the remote-copy processing of the MFP 100.

Figure 14:
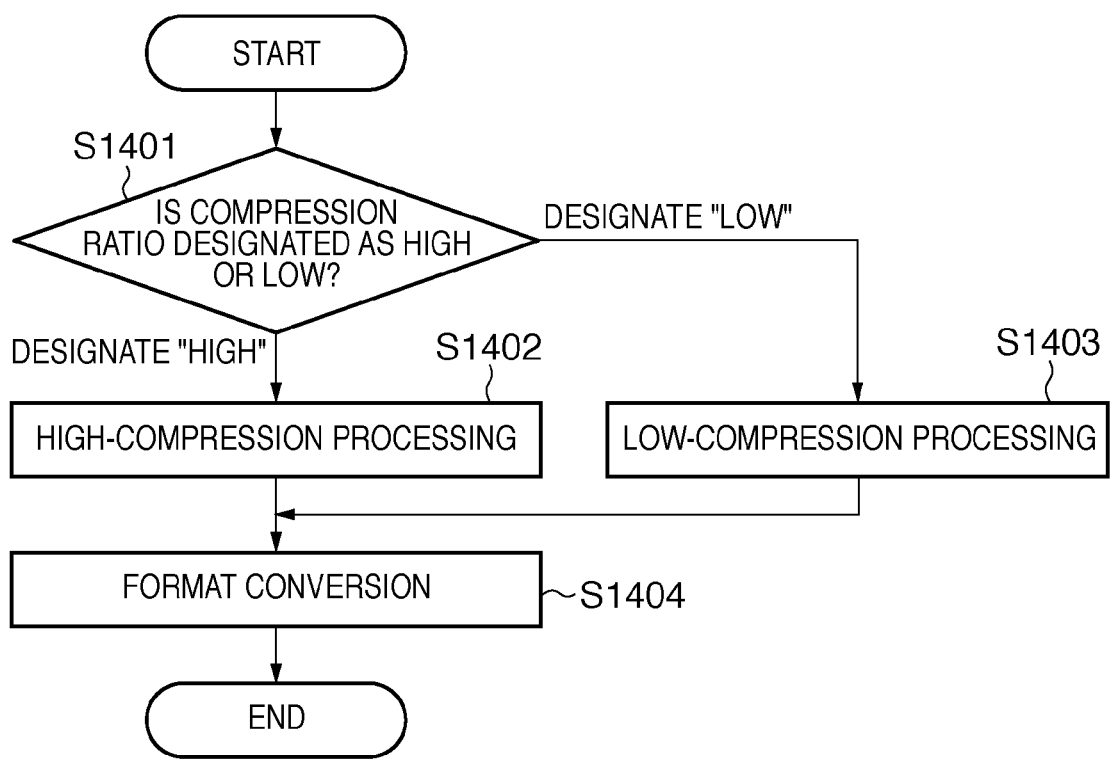
FIG. 14 is a flowchart showing the sequence of image sending processing in step S1107 shown in FIG. 11.

FIG. 14 is a flowchart showing the sequence of the image sending processing in step S1107 shown in FIG. 11. A program required to implement the flowchart shown in FIG. 14 is stored in the ROM 210 or hard disk 211 of the MFP 100, and is executed by the CPU 205.

It is checked in step S1401 if a compression ratio designated in step S1101 is high or low compression. If it is determined that high compression is designated, compression processing is executed using the high-compression quantization table shown in FIG. 6B in step S1402. On the other hand, if it is determined that low compression is designated, compression processing is executed using the low-compression quantization table shown in FIG. 6A in step S1403.

In step S1404, format conversion is executed. If an image undergoes, e.g., JPEG compression in step S1402 or S1403, and is sent in a JPEG format, no format conversion is required. On the other hand, for example, if the JPEG format is converted into a PDF format, such conversion can be done in step S1404. In this case, the JPEG format can be converted into the PDF format by appending a PDF header to the JPEG format. On the other hand, the image format may be converted into another format such as TIFF, WMP, or the like in place of the PDF format.

FIG. 12 is a flowchart for explaining the sequence of processing of the MFP 101 as the receiver. In step S1201, the MFP 101 receives data sent from the MFP 100 as the sender.

In step S1202, the received image is temporarily saved in the hard disk 211. In general, the image is compressed in this case.

In step S1203, the received image saved in step S1202 is read out. If the image is compressed in step S1202, it is decompressed as needed. The compressed image saved in the hard disk 211 may be saved for re-use later or may be deleted.

In step S1204, the image undergoes color selection processing. The color selection processing will be described later.

The print image processing described using FIG. 7 is executed in step S1205, and the image is printed out in step S1206.

FIG. 13 is a flowchart showing the sequence of the color selection processing according to the first embodiment. FIG. 13 shows the processing in step S1204 shown in FIG. 12.

In step S1301, format analysis is made. In this embodiment, as the format analysis, for example, the formats of JPEG, PDF, TIFF, and WMP are analyzed. In this case, for example, the format of the received image is determined, and a compressed data part is extracted. In the following description, assume that the compressed data is JPEG data. For example, in case of the PDF format, a PDF header may be removed to extract a JPEG data part.

In step S1302, the JPEG compressed data extracted in step S1301 is decompressed. In this case, a generally known method is used to decompress the JPEG compressed data.

In step S1303, a compression ratio is calculated. Note that the compression ratio is calculated by:

$$\text{Compression ratio} = \text{compressed image data size} \div \text{data size after decompression} \qquad (1)$$

For example, if the compressed image data size is 1 Mbyte, and the data size after decompression is 100 Mbytes, the compression ratio is 1/100.

In step S1304, the compression ratio calculated in step S1303 is compared with a reference value th1 as a predetermined reference. If the compression ratio is smaller than the reference value th1, it is determined that the compression ratio is "high compression", and "A" is set as a color selection threshold th2 in step S1305. On the other hand, if the compression ratio is equal to or larger than the reference value, it is determined that the compression ratio is "low compression", and "B" is set as the color selection threshold th2 in step S1306. In this embodiment, as described above, one of the first value "A" and second value "B" is decided as the color selection threshold based on the compression ratio (to be also referred to as a "decision unit" hereinafter). The first value "A" and second value "B" as the color selection thresholds will be described later.

In step S1307, image data is converted from an RGB color space into an L*a*b* color space as one of uniform color spaces.

In step S1308, signals a and b converted in step S1307 are compared as saturation signals with the threshold th2 set in step S1305 or S1306. If the signals a and b are larger than the threshold th2, a pixel indicated by these signals is counted as a chromatic color pixel in step S1309. On the other hand, if the signals a and b are equal to or smaller than the threshold th2, that pixel undergoes monochrome processing as an achromatic color pixel in step S1310. The monochrome processing means equalization processing, and the signals a and b are set to be a=b. In this case, for example, the average value of a and b may be substituted in a and b. As a result, since R=G=B is set upon converting the L*a*b* color space into the RGB color space in step S1312 to be described later, the output color correction unit 703 shown in FIG. 7 can generate a black single color.

If it is determined in step S1311 that processing for all pixels is complete, the L*a*b* color space is converted into the RGB color space in step S1312. On the other hand, if the processing is not complete yet, the process returns to step S1308.

If it is determined in step S1313 that the count value of pixels determined as chromatic color pixels in step S1309 is larger than a threshold th3 indicating a predetermined value, it is determined in step S1314 that the document is a color document. On the other hand, if the count value of pixels determined as chromatic color pixels in step S1309 is equal to or smaller than the threshold th3 indicating the predetermined value, it is determined in step S1315 that the document is a monochrome document. Steps S1314 and S1315 are document determination steps for determining if the document is a color or monochrome document. In this embodiment, if a color document is determined, a color charging process may be made; if a monochrome document is determined, a monochrome charging process may be made.

Note that there may be a case in which the document including pixels determined as chromatic color pixels in step S1309 is determined as a monochrome document in step S1315. Such case does not especially pose any problem for the following reason. As described above, the threshold th2 is set as "A" or "B" in step S1305 or S1306, so that a pixel which is originally an achromatic color pixel is determined as an achromatic color in step S1308. However, depending on the setting of the threshold th2, all pixels which are originally achromatic color pixels may not often be determined as achromatic color pixels (for example, pixels that suffer unexpectedly large color fluctuations are included). Since these pixels which are not determined as achromatic color pixels are originally achromatic color pixels, no problem is especially posed if a document including such pixels is determined as a monochrome document.

FIGS. 15A, 15B, and 15C are views for explaining the color selection threshold set in step S1305 or S1306 shown in FIG. 13. Also, "a" and "b" shown in FIGS. 15A to 15C indicate the ordinate and abscissa of the L*a*b* color space as one of uniform color spaces.

FIG. 15A shows a state in which originally monochrome pixels have been changed to color pixels when colors printed in monochrome on a paper document are scanned upon execution of the remote-copy function, as has been described above. More specifically, FIG. 15A shows the distribution of an ab space of an image which has undergone color conversion into the L*a*b* space in step S1307 shown in FIG. 13 when "low compression" is designated as a compression ratio and the remote-copy processing of a monochrome document is executed. As shown in FIG. 15A, original monochrome pixels must be distributed at (a, b)=(0, 0) in step S1307, but color fluctuations of pixels have occurred within ranges of $-10<a<10$ and $-10<b<10$.

FIG. 15B shows the distribution of the ab space of an image which has undergone color conversion into the L*a*b* space in step S1307 shown in FIG. 13 when "high compression" is designated as a compression ratio and the remote-copy processing of a monochrome document is executed. As shown in FIG. 15B, color fluctuations exceed the ranges of $-10<a<10$ and $-10<b<10$. As shown in FIGS. 15A and 15B, when the compression ratio changes, the degree of color fluctuations undesirably changes.

FIG. 15C shows the thresholds "A" and "B" which are statistically calculated from FIGS. 15A and 15B. Note that the threshold "A" is used when the compression ratio is determined as "high compression", and indicates ranges of $-20<a<20$ and $-20<b<20$. On the other hand, the threshold "B" is used when the compression ratio is determined as "low compression", and indicates ranges of $-10<a<10$ and $-10<b<10$.

As described above, according to this embodiment, even when color fluctuations of compressed data have occurred due to a change in compression ratio in the remote-copy processing, color selection can be implemented with high precision. As a result, problems posed upon formation of a monochrome document using four colors, e.g., C, M, Y, and K colors (for example, wasting of toners, inks, and the like, a quality drop due to slight color misregistration, unwanted color charging for a monochrome document, and the like) can be prevented.

In the first embodiment, as has been described above using the flowchart shown in FIG. 13, the compression ratio is calculated in step S1303, and the color selection threshold is changed based on the calculated compression ratio in step S1305 or S1306. However, since the compression ratio largely depends on the document contents, the degree of color fluctuations may vary even at the same compression ratio. In the second embodiment, such problem is avoided by changing the threshold based on a JPEG quantization table. Note that a description of the drawings used to explain the same processes as in the first embodiment will not be repeated.

Figure 16:
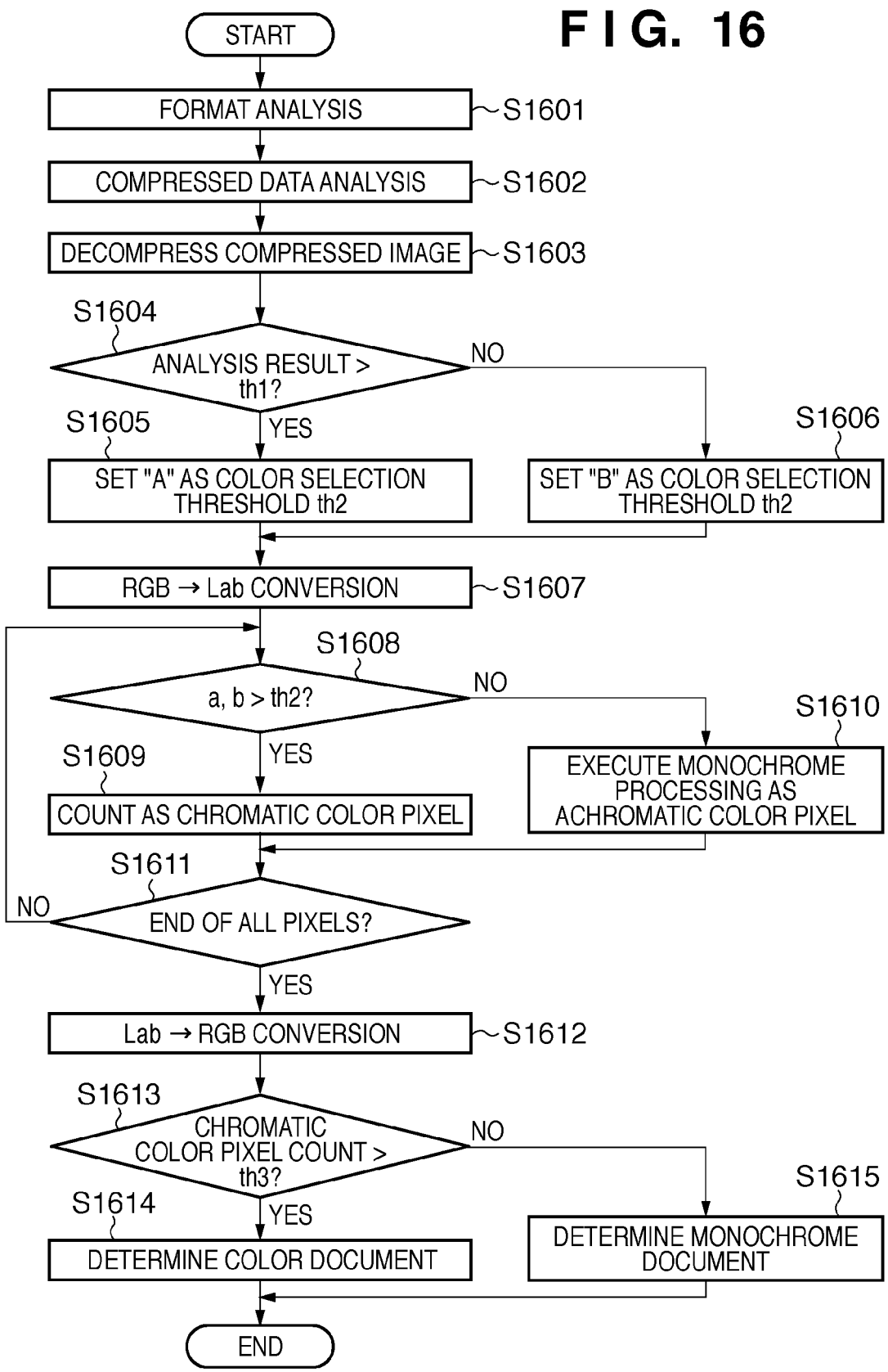
FIG. 16 is a flowchart showing the sequence of color selection processing according to the second embodiment.

FIG. 16 is a flowchart showing the sequence of color selection processing according to the second embodiment. The flowchart shown in FIG. 16 shows the color selection processing in step S1204 in FIG. 12. Programs required to implement these flowcharts are stored in the ROM 210 or hard disk 211 of the MFP 101, and are executed by the CPU 205.

In step S1601, format analysis is executed, as described in step S1301 and, for example, a JPEG data part is extracted.

In step S1602, the JPEG compressed data extracted in step S1601 is analyzed. An example of the analysis method of the JPEG compressed data will be described below.

As has been described above, the compressed data 507 as JPEG data holds the quantization table 503 and encoding table 505 applied at the time of compression. Note that JPEG data is normally segmented by markers, and the quantization table and encoding table applied at the time of compression can be looked up with reference to these markers. That is, when the remote-copy processing is executed while a compression ratio is designated as "low compression", the quantization table shown in FIG. 6A can be looked up from the compressed data. On the other hand, when the remote-copy processing is executed while a compression ratio is designated as "high compression", the quantization table shown in FIG. 6B can be looked up from the compressed data. In step S1602, the quantization table which is looked up undergoes calculations using a predetermined calculation method, and the calculation result is saved as an analysis result. The calculation method will be described later.

In step S1603, the JPEG compressed data is decompressed, as described in step S1302.

In step S1604, the value saved as the analysis result in step S1602 is compared with a predetermined reference value th1. If the analysis result is larger than the reference value th1, it is determined that the compression ratio is "high compression", and "A" is set as a color selection threshold th2 in step S1605. On the other hand, if the analysis result is equal to or smaller than the reference value, it is determined that the compression ratio is "low compression", and "B" is set as the color selection threshold th2 in step S1606. In this embodiment, as described above, the color selection threshold is changed based on the analysis result of the compressed data. Subsequent steps S1607 to S1615 are same as steps S1307 to S1315 in FIG. 13 of the first embodiment.

FIGS. 17A and 17B are views for explaining an example of the calculation method described in FIG. 16. In FIG. 17A or 17B, values bounded by a rectangle are those in the quantization table used in the calculations in step S1602 shown in FIG. 16. In this embodiment, as shown in FIG. 17A or 17B, the average value of nine values as the predetermined number of values is calculated, and is used as the analysis result. The analysis result calculated in FIG. 17A is "25.2". The analysis result calculated in FIG. 17B is "40.9". The calculated analysis result is used in step S1604.

In this embodiment, the calculations may be made using other elements such as high-frequency components of the quantization table, those of a color difference quantization table, those of an encoding table such as a Huffman table or the like, sub-sampling coefficients, and the like, as long as they can be detected of the JPEG format.

As described above, according to this embodiment, even when color fluctuations of compressed data have occurred by changing the compression ratio in the remote-copy processing, color selection can be executed with high precision by a method independent from the document contents.

In the first or second embodiment, the color selection threshold is changed based on the compression ratio or the analysis result of compressed data. However, as indicated by pixels 1801 and 1802 in FIG. 18, color fluctuations may exceed the range of the threshold "B" even when the remote-copy processing is executed while "low compression" is designated as a compression ratio. In such case, the pixels 1801 and 1802 do not undergo monochrome processing. In order to solve this problem, the third embodiment applies the monochrome processing even when the range of the threshold "B" is exceeded. Note that a description of the drawings used to explain the same processes as in the first embodiment will not be repeated.

Figure 19:
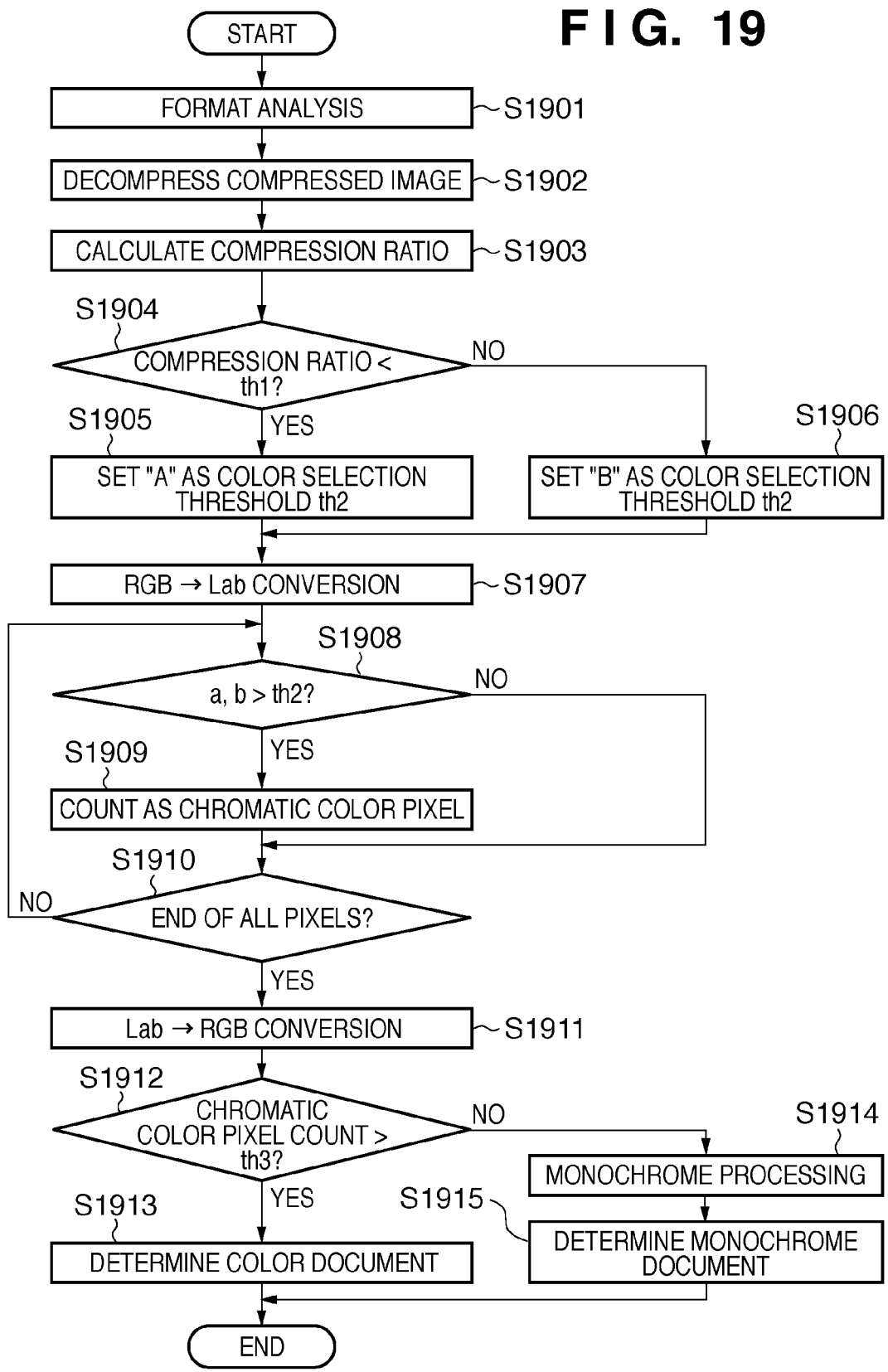
FIG. 19 is a flowchart showing the sequence of color selection processing according to the third embodiment.

FIG. 19 is a flowchart showing the sequence of color selection processing according to the third embodiment. The flowchart shown in FIG. 19 shows the color selection processing in step S1204 in FIG. 12. Programs required to implement these flowcharts are stored in the ROM 210 or hard disk 211 of the MFP 101, and are executed by the CPU 205.

Steps S1901 to S1908 are the same as the description of steps S1301 to S1308 shown in FIG. 13.

In step S1908, signals a and b converted in step S1907 are compared as saturation signals with a threshold th2 set in step S1905 or S1906. If the signals a and b are larger than the threshold th2, a pixel indicated by these signals is counted as a chromatic color pixel in step S1909. On the other hand, if the signals a and b are equal to or smaller than the threshold th2, the process jumps to step S1910 without any processing.

If it is determined in step S1910 that processing for all pixels is complete, the L*a*b* color space is converted into the RGB color space in step S1911. On the other hand, if it is determined that the processing is not complete yet, the process returns to step S1908.

If it is determined in step S1912 that the count value of pixels determined as chromatic color pixels in step S1909 is larger than a threshold th3 indicating a predetermined value, it is determined that the document is a color document in step S1913. On the other hand, if the count value of pixels determined as chromatic color pixels in step S1909 is equal to or smaller than the threshold indicating the predetermined value, monochrome processing is executed in step S1914, and it is determined in step S1915 that the document is a monochrome document. In this embodiment, if a color document is determined, a color charging process may be made; if a monochrome document is determined, a monochrome charging process may be made.

Figure 18:
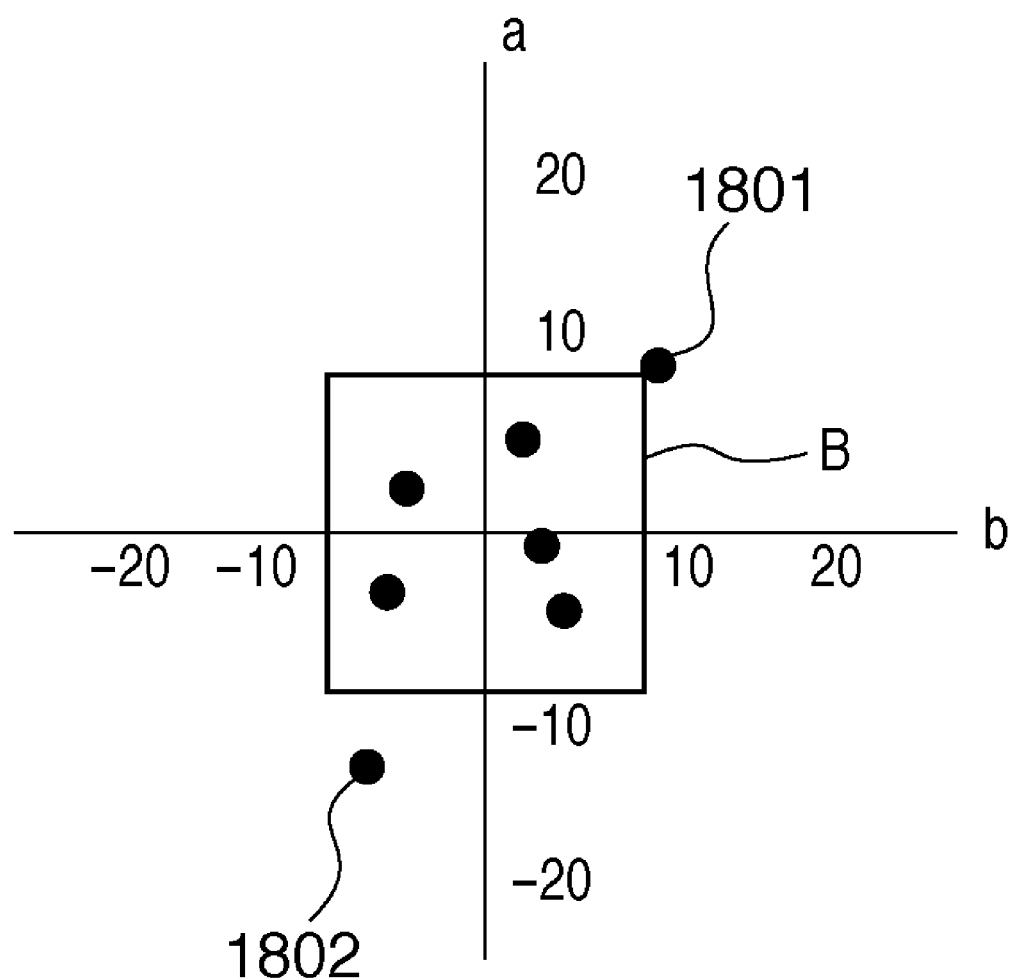
FIG. 18 is a view for explaining a case in which the range of a threshold B is exceeded upon designation of "low compression" as a compression ratio.

As described above, in this embodiment, since the monochrome processing is executed based on the determination result in step S1912 in place of that in step S1908, the monochrome processing can be executed even when pixels exceed the range of the threshold "B", as shown in FIG. 18.

In the first to third embodiments, the color selection threshold is changed based on the compression ratio or the analysis result of compressed data. As described in the first embodiment, the undercolor removal unit 701 and filter processing unit 704 shown in FIG. 7 execute their processes independently of the compression ratio or the analysis result of compressed data. In the fourth embodiment, since these image processes are executed based on the compression ratio or the analysis result of compressed data, color selection processing can be executed with higher precision, and the image quality can be improved. Note that a description of the drawings used to explain the same processes as in the first embodiment will not be repeated.

Figure 20A:
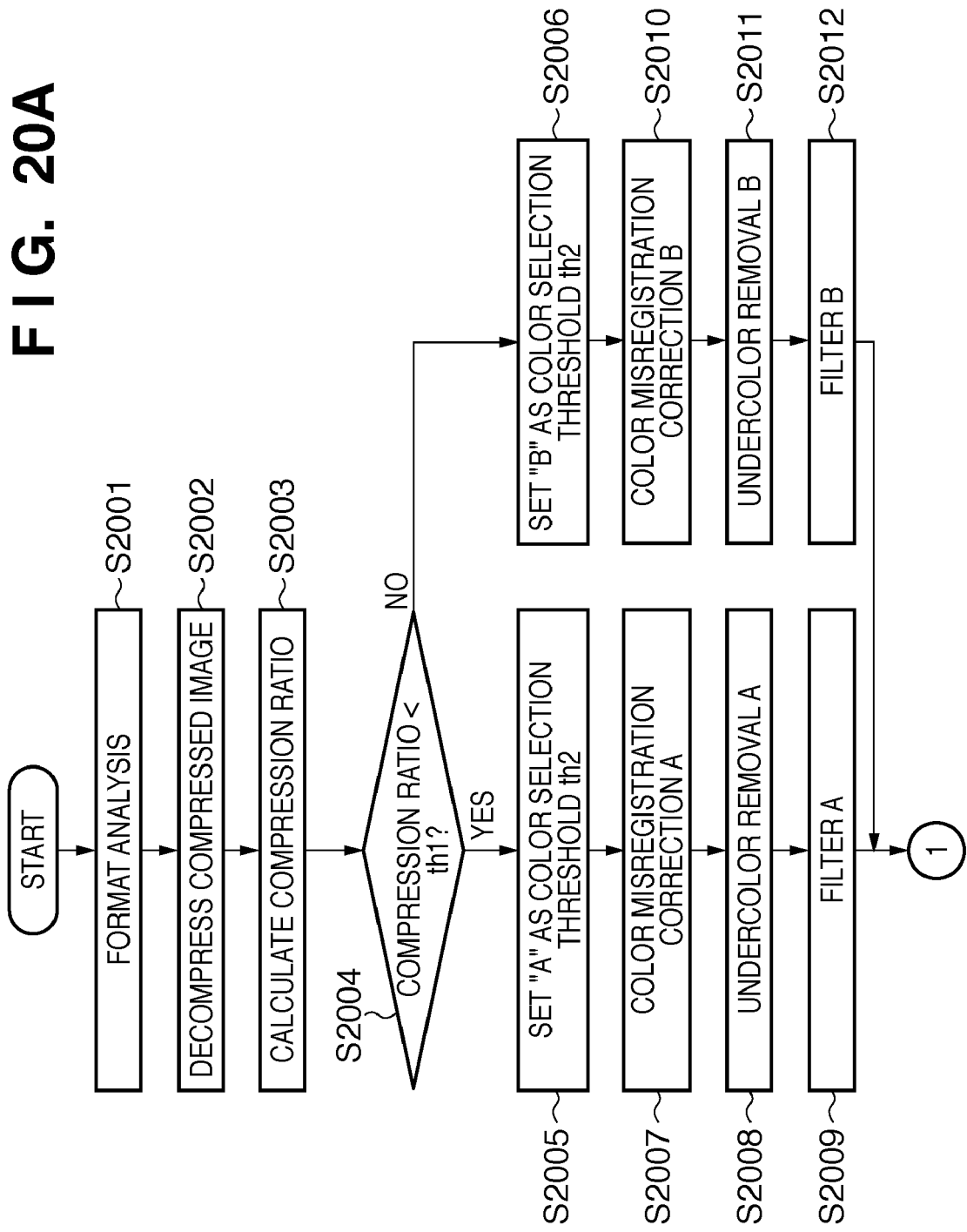

FIGS. 20A and 20B are flowcharts showing details of color selection processing according to the fourth embodiment. The flowcharts shown in FIGS. 20A and 20B show the color selection processing in step S1204 in FIG. 12. Programs required to implement these flowcharts are stored in the ROM 210 or hard disk 211 of the MFP 101, and are executed by the CPU 205.

Steps S2001 to S2004 and steps S2013 to S2021 are the same as the description of steps S1301 to S1304 and steps S1307 to S1315 shown in FIG. 13.

In step S2004, a compression ratio calculated in step S2003 is compared with a predetermined reference value th1. If the calculated compression ratio is smaller than the reference value th1, "A" is set as a color selection threshold th2 in step S2005. Furthermore, in steps S2007 to S2009, color misregistration correction A, undercolor removal A, and filter processing A are executed. On the other hand, if the compression ratio is equal to or larger than the reference value, "B" is set as the color selection threshold th2 in step S2006. Furthermore, in steps S2010 to S2012, color misregistration correction B, undercolor removal B, and filter processing B are executed.

As described above, since the color misregistration correction, undercolor removal, and filter processing are executed based on the compression ratio or the analysis result of compressed data, and the color selection processing is then executed, the color selection processing can be implemented with higher precision, and the image quality can be improved.

In the first to fourth embodiments, a color selection threshold is changed based on the compression ratio or the analysis result of compressed data. In the fifth embodiment, a color selection threshold is changed based on text/photo selection signals obtained from the scanner image processing in addition to the compression ratio or the analysis result of compressed data. As a result, the color selection processing can be executed with higher precision, and the image quality can be improved.

Figure 21A:
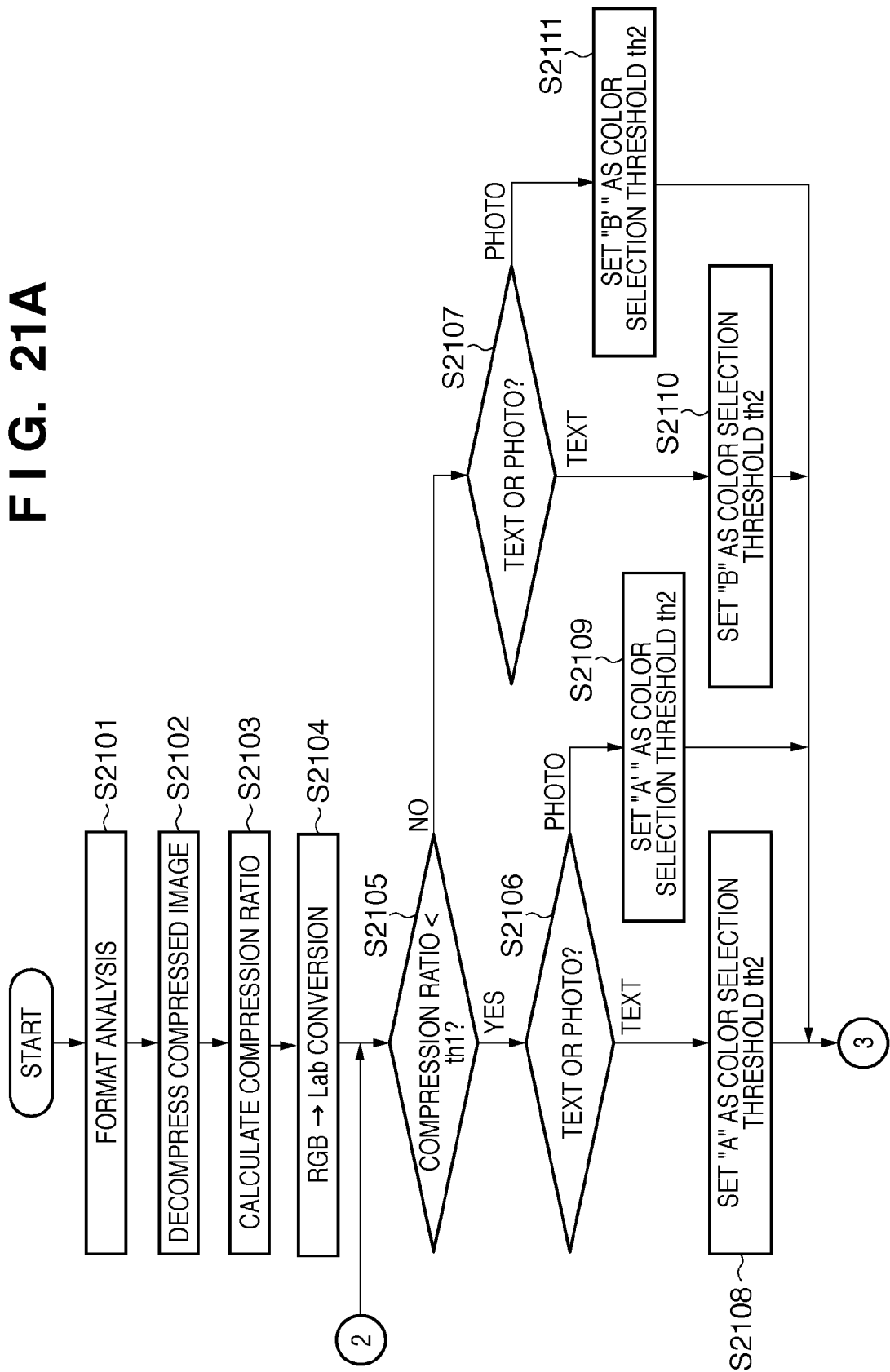
FIGS. 21A and 21B are flowcharts showing details of color selection processing according to the fifth embodiment.
Figure 21B:
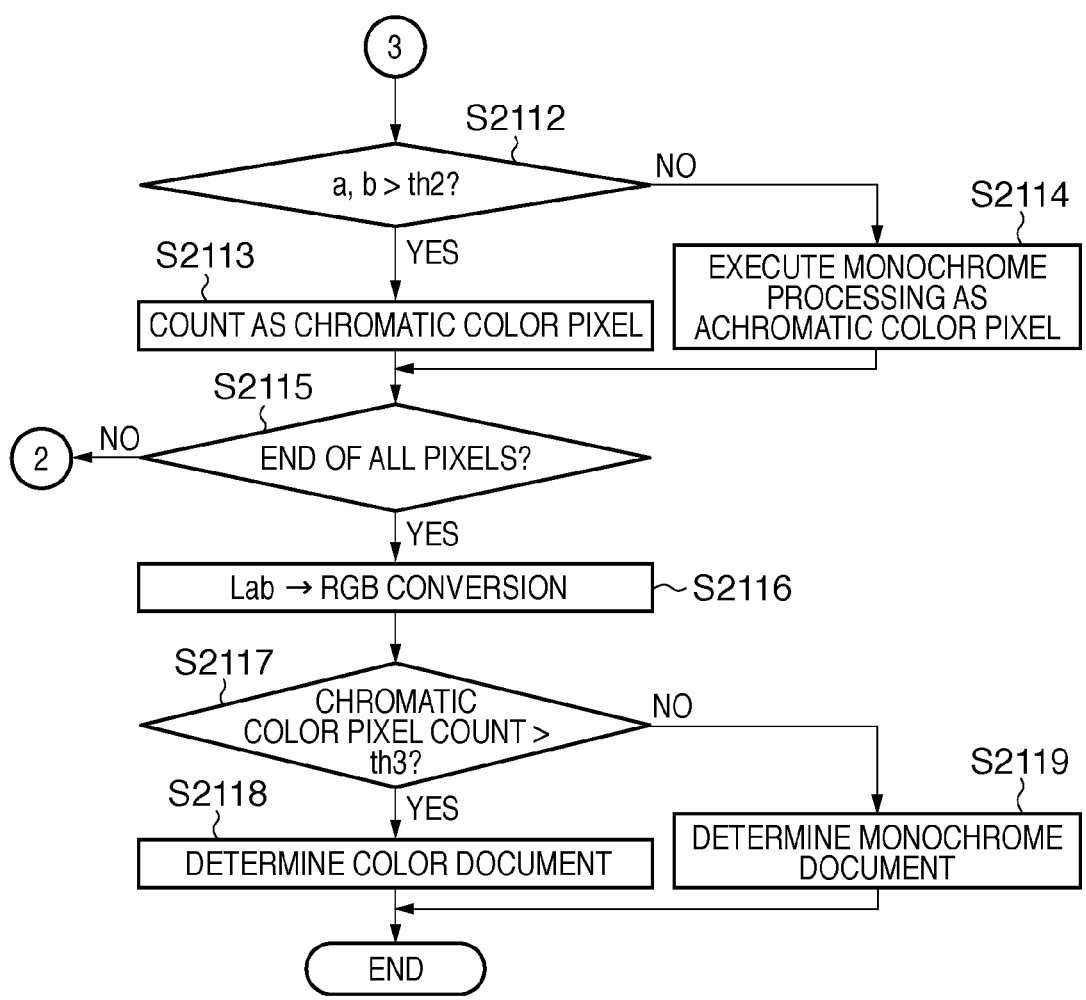

FIGS. 21A and 21B are flowcharts showing details of color selection processing according to the fifth embodiment. The flowcharts shown in FIGS. 21A and 21B show the color selection processing in step S1204 in FIG. 12. Programs required to implement these flowcharts are stored in the ROM 210 or hard disk 211 of the MFP 101, and are executed by the CPU 205.

Steps S2101 to S2105 and steps S2112 to S2119 are the same as steps S1301 to S1304,S1307 and steps S1308 to S1315 in FIG. 13, and a repetitive description thereof will be avoided.

In step S2105, a compression ratio calculated in step S2103 is compared with a predetermined reference value th1. If the compression ratio is smaller than the reference value th1, it is determined that the compression ratio is "high compression", and it is checked in step S2106 if the attribute of the pixel is "text" or "photo". If it is determined that the attribute of the pixel is "text", "A" is set as a color selection threshold th2 in step S2108. On the other hand, if it is determined that the attribute of the pixel is "photo", "A'" is set as the color selection threshold th2 in step S2109. On the other hand, if the compression ratio is equal to or larger than the reference value, it is determined that the compression ratio is "low compression", and it is checked in step S2107 if the attribute of the pixel is "text" or "photo". If it is determined that the attribute of the pixel is "text", "B" is set as the color selection threshold th2 in step S2110. On the other hand, if it is determined that the attribute of the pixel is "photo", "B'" is set as the color selection threshold th2 in step S2111. In this manner, in this embodiment, the color selection threshold is set based on the compression ratio and attribute.

As described above, since the color selection threshold is changed based on the compression ratio and attribute, the color selection processing can be executed with higher precision, and the image quality can be improved.

This embodiment may be applied to either a system configured by a plurality of devices (for example, a host computer, interface device, reader, printer, and the like), or an apparatus configured by a single device (for example, a copying machine or facsimile apparatus). In this embodiment, a computer-readable recording medium which records program codes of software as an image processing program may be supplied to a system or apparatus, and a CPU, MPU or the like may read out and execute the program codes stored in the recording medium. In this case, as the recording medium used to supply the program codes, for example, a floppy® disk, hard disk, optical disk, magneto-optical disk, DVD-ROM, DVD-R, CD-ROM, CD-R, magnetic tape, or nonvolatile memory card may be used.

In this embodiment, not only the readout program codes are executed, but also an OS or the like, which runs on a computer, may execute some or all of actual processes based on instructions of the program codes. Furthermore, the program codes read out from the recording medium may be written in a memory equipped on a function expansion board or a function expansion unit, which is inserted in or connected to the computer. In this case, a CPU or the like equipped on the function expansion board or unit may execute some or all of actual processes based on the instructions of the program codes, thus implementing the functions of this embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-317590, filed Dec. 7, 2007, which is hereby incorporated by reference herein in its entirety.

What is claimed is:

1. An image processing apparatus configured to receive compressed data from an external apparatus and to determine, based on pixels included in the compressed data, if the compressed data is a color document data or a monochrome document data, the apparatus comprising:
   a decision unit configured to decide a color selection threshold based on the received compressed data; and
   a determination unit configured to determine according to the color selection threshold decided by said decision unit if a pixel included in the compressed data is a chromatic color pixel or an achromatic color pixel.

2. The apparatus according to claim 1, wherein said decision unit is configured to calculate a compression ratio of the compressed data, to compare the compression ratio with a reference value, to decide a predetermined first value as the color selection threshold when the compression ratio is smaller than the reference value, and to decide a predetermined second value as the color selection threshold when the compression ratio is not less than the reference value.

3. The apparatus according to claim 2, wherein the compression ratio is a ratio between a data size of the compressed data and a data size of the decompressed compressed data.

4. The apparatus according to claim 1, wherein said decision unit is configured to calculate a coefficient with reference to a table which is included in the compressed data and is used at the time of compression of the compressed data, to compare the coefficient with a reference value, to decide a predetermined first value as the color selection threshold when the coefficient is larger than the reference value, and to decide a predetermined second value as the color selection threshold when the coefficient is not more than the reference value.

5. The apparatus according to claim 4, wherein the coefficient is an average value of compression coefficients of the predetermined number, which are included in the table.

6. The apparatus according to claim 1, further comprising:
   a comparison unit configured to compare the number of pixels determined as chromatic color pixels by said determination unit with a predetermined value; and
   a document determination unit configured to determine that the compressed data is a color document data when the number of pixels determined as the chromatic color pixels is larger than the predetermined value, and to determine that the compressed data is a monochrome document data when the number of pixels determined as the chromatic color pixels is not more than the predetermined value.

7. The apparatus according to claim 4, wherein the table used at the time of compression of the compressed data is a quantization table, and the coefficient is calculated using values in the quantization table.

8. The apparatus according to claim 1, wherein a format of the compressed data is one of JPEG, PDF, TIFF, and WMP.

9. The apparatus according to claim 2, wherein when the compression ratio is smaller than the reference value or when the compression ratio is not less than the reference value, said decision unit is configured to further refer to an attribute of the pixel, and to decide a value according to the attribute of the pixel as the color selection threshold.

10. The apparatus according to claim 9, wherein the attribute of the pixel indicates a text or photo attribute.

11. The apparatus according to claim 1, wherein said decision unit is configured to execute some of image processes according to the decided color selection threshold, and
   said determination unit is configured to determine based on the execution results of some of the image processes and according to the color selection threshold if the pixel included in the compressed data is a chromatic color pixel or an achromatic color pixel.

12. The apparatus according to claim 11, wherein the some of the image processes include a color misregistration correction process, an undercolor removal process, and a filter process.

13. An image processing method executed by an image processing apparatus, which receives compressed data from an external apparatus and determines, based on pixels included in the compressed data if the compressed data is a color document data or a monochrome document data, the method comprising:
   a decision step of deciding a color selection threshold based on the received compressed data; and
   a determination step of determining according to the color selection threshold decided in the decision step if a pixel included in the compressed data is a chromatic color pixel or an achromatic color pixel.

14. A non-transitory computer-readable medium storing an image processing program configured to be executed at least by a computer in an image processing apparatus that receives compressed data from an external apparatus and determines, based on pixels included in the compressed data, if the compressed data is a color document data or a monochrome document data, the program, when executed, causing the image processing apparatus to execute an image processing method comprising the steps of:
   deciding a color selection threshold based on the received compressed data; and
   determining according to the decided color selection threshold if a pixel included in the compressed data is a chromatic color pixel or an achromatic color pixel.

* * * * *